US010078845B2

(12) United States Patent
Brewer et al.

(10) Patent No.: US 10,078,845 B2
(45) Date of Patent: Sep. 18, 2018

(54) MARKETING APPLICATION INCLUDING EVENT AND SURVEY DEVELOPMENT AND MANAGEMENT

(71) Applicants: John Brewer, Malvern, PA (US); Salma Khan, Parkesburg, PA (US)

(72) Inventors: John Brewer, Malvern, PA (US); Salma Khan, Parkesburg, PA (US)

(73) Assignee: RICOH COMPANY, LTD., Tokyo (JP)

( * ) Notice: Subject to any disclaimer, the term of this patent is extended or adjusted under 35 U.S.C. 154(b) by 723 days.

(21) Appl. No.: 14/598,755

(22) Filed: Jan. 16, 2015

(65) Prior Publication Data

US 2016/0210644 A1  Jul. 21, 2016

(51) Int. Cl.
*G06Q 30/02* (2012.01)
(52) U.S. Cl.
CPC .................. *G06Q 30/0203* (2013.01)
(58) Field of Classification Search
CPC ......... G06Q 10/00; G06Q 10/06; G06F 17/60
USPC ........................................................ 705/7.29
See application file for complete search history.

(56) References Cited

U.S. PATENT DOCUMENTS

| 2002/0052774 A1* | 5/2002 | Parker .................... G06Q 30/02 705/7.32 |
| 2008/0059256 A1* | 3/2008 | Lynch .................. G06Q 10/063 705/7.24 |
| 2009/0292783 A1* | 11/2009 | Burke .................... G06Q 10/10 709/206 |
| 2014/0351063 A1 | 11/2014 | Brewer et al. |

OTHER PUBLICATIONS

U.S. Appl. No. 13/900,132, John Brewer, Salma Khan, Marketing Campaign Development and Management, Pending (US 2014/0351063 A1).
U.S. Appl. No. 14/199,903, John Brewer, Cameron Altenhof-Long, Content Dynamically Targetted According to Context.
U.S. Appl. No. 14/199,903, John Brewer et al., Mar. 6, 2014.

\* cited by examiner

*Primary Examiner* — Romain Jeanty
(74) *Attorney, Agent, or Firm* — Cooper & Dunham LLP

(57) ABSTRACT

A marketing application includes provisions (e.g., graphical user interface) for a user to create one or more surveys in connection with a marketing campaign or event, while permitting the user to access data and information maintained for such campaign or event.

19 Claims, 53 Drawing Sheets

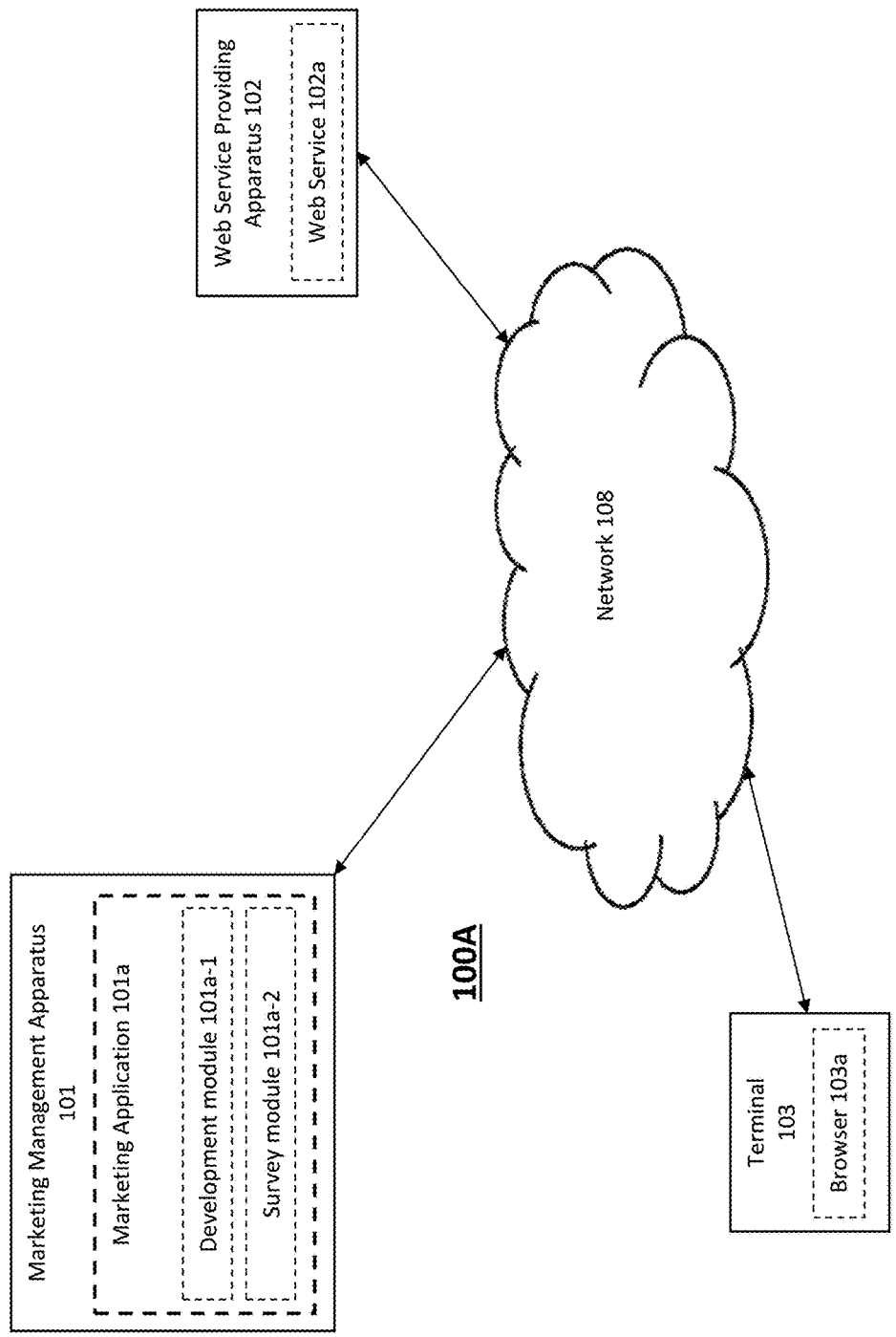

Survey: Consumers

Start Date (date you can start survey):
08/12/14 8:00 AM

End Date (deadline for finishing survey):
11/21/14 11:59 PM

Question 1: How would you score the performance of our speakers (from 1-10)?

- ☐ Kobi Takoyaki
- ☐ Franz Hipper
- ☐ Anthony Johnson

Question 2: Which unveiled products at our event did you find interesting?

- ☐ RE 987 Tablet
- ☐ C91 Laptop
- ☐ Ricoh PC 90000
- ☐ MePhone 7Y
- ☐ Operating System V7
- ☐ OMEGA Smart Watch

Question 3: Please check mark the boxes of the list of electronic devices that your employees currently use for everyday work. Further, please, for each electronic device, give the total number that your company owns.

Back

User: Sam Church | Help | Log Out | My Order

| Calendar | Event Campaign | Email Marketing | Promotional Material | Survey |

1 Choose Event Theme | 2 Event Description | 3 Event Guest List | 4 Create Agenda/Topic | 5 Custom Fields | 6 Customize Materials | 7 Review/Submit Event Details

Customize Materials

View: Invitation ▼  Preview

You're Invited!!!!!

Unveiling New Products at Ricoh Conference Center

Are you interested in the latest Ricoh achievements in the sciences or are obsessed with Ricoh branded products? Then come to this Event. We have technology developed by Ricoh from all over the world including Europe, China and Japan.

Dates:
August 8, 2014 – August 11, 2014

Location:
Ricoh Conference Center

Event Details:
Introduction
August 8, 2014 (9:00 AM – 10:00 AM)
Main Hall

See attached RSVP Post Card

Find more info at www.atcc.com/events

Add Logos

Back (Step 5)  Save Progress  Next (Step 7)

Fig. 12I

User: Sam Church | Help | Log Out | My Order

| Calendar | Event Campaign | Email Marketing | Promotional Material | Survey |

1 Choose Event Theme    2 Event Description    3 Event Guest List    4 Create Agenda/Topic    5 Custom Fields    6 Customize Materials    7 Preview/Submit Event Details

Events Detail and Schedule (edit)

Event Name: Ricoh Products Marketing Event
Description: For three days, Ricoh Corporation S.A. will be unveiling the newest products that we have developed last year.
Event Date(s): August 8, 2014 -- August 11, 2014
Event Location: Ricoh Conference Center, 78 Nova Technology Drive, Harristown, PA, 859626

Agenda/Topics (edit)

Introduction
Introduce the event to the participants
Start: 9:30 AM  End: 9:50 AM  Location: Main Hall
Product Line (Handheld Devices) Unveiling
Show off the newest developed handheld devices
Start: 10:15 AM End: 3:00 PM Location: Showroom Fl.

Events Detail and Schedule (edit)

| Guest List  | Upload Date         |
|-------------|---------------------|
| Guests.csv  | 06/21/2014 2:00 PM  |

Survey 1: Consumers (preview)
Survey 2: Managers (preview)

Custom Registration Fields (edit)

1. How did you find out about this event?
   Options: Internet, Friends, Newspaper.
2. How easy was our signup process?
   Options: rating of 1 to 5 stars.

Custom Materials (edit)

Save the Date (preview | test)   Reminder (preview | test)
Invitations (preview | test)     Thank You (preview | test)

[Back (Step 6)]        [Save Progress]        [Submit]

| | | | | | User: Sam Church \| Help \| Log Out \| My Order |
|---|---|---|---|---|---|
| *Calendar* | *Event Campaign* | *Email Marketing* | *Promotional Material* | | *Survey* |

| 1 Choose Event Theme | 2 Event Description | 3 Event Guest List | 4 Create Agenda/ Topic | 5 Custom Fields | 6 Customize Materials | 7 Review/Submit Event Details |
|---|---|---|---|---|---|---|

Confirmation

Your direct mail request has been successfully submitted for review and approval!

You will be notified via email when the event is approved.

[ Return ]

Fig. 12L

| User: Sam Church | Help | Log Out | My Order |
|---|
| Calendar | Event Campaign | Email Marketing | Promotional Material | Survey |

[ Create Survey ]

[ In Progress ] [ Submitted ] [ In Review ] [ Approved ]

| Submitter Name | Survey Name | |
|---|---|---|
| John Doe | Consumer Product | View Details |
| Jane Knight | Robot Review | View Details |
| | | |
| | | |

User: Sam Church | Help | Log Out | My Order

Calendar | Event Campaign | Email Marketing | Promotional Material | Survey

1 Create Survey  2 Contact List  3 Create Questions  4 Launch Survey

Create Questions

| Rating Scale | Add | Dropdown | Add | Yes/No Questions | Add |
| Single Textbox | Add | Check Boxes | Add | Comments Box | Add |
| Multiple Choice | Add | Associate with Event | Add | Score Box | Add |

Question Builder

Question 1: What did you think of today's event?
- It was great! (Delete)
- It was OK. (Delete)
- It was over-hyped. (Delete)
+ Add more answer choices Delete Question 1

Question 2: *Input your question here*

Delete Question 2

[Back (Step 2)]  [Save Progress]  [Next (Step 4)]

Fig. 16D

Fig. 16E http://www.ricoh.com/event/survey/consumers

Welcome Mr. Tinson!

Please complete the surveys below that correspond to each of the three days at the event. If you did not attend more than one day, you can still submit the survey without need to complete the others.

| Day 1 | Day 2 | Day 3 |

Question 1: How would you score the performance of our speakers?

- Kobi Takoyaki — 1
- Franz Hipper — 9
- Anthony Johnson — 5

Question 2: Which unveiled products at our event did you find interesting?

- ☐ RE 987 Tablet
- ☐ C91 Laptop
- ☒ Ricoh PC 90000
- ☒ MePhone 7Y
- ☒ Operating System V7
- ☐ OMEGA Smart Watch

[ Submit ]

Fig. 17E

RICOH MEDIA

Welcome Ms. Turner!

Please complete the surveys below that correspond to each of the three days at the event. If you did not attend more than one day, you can still submit the survey without need to complete the others.

| Day 1 | Day 2 | Day 3 |

Question 1: Is there a product at the event that you believe is very useful for your company? If so, which one? And can you please explain how your company would use it?

○ No
○ Yes  [ Ricoh Tax 10.1 ▼ ]

*Please insert explanation here. Thank you.*

Question 2: Please check products at our event that you were able to observe and please rate them on a scale of 1 to 5 stars (with 5 stars being the highest).

☒ Ricoh Tax 10.1   ☆ ☆ ☆ ☆ ☆
☐ Eng CAD X        ☆ ☆ ☆ ☆ ☆
☒ Ricoh CompuMath  ☆ ☆ ☆ ☆ ☆

[ Submit ]

Fig. 17F

User: Sam Church | Help | Log Out | My Order

Calendar | Event Campaign | Email Marketing | Promotional Material | Survey

Survey Name

[ Export Response ]  [ Reports ]

| Name | Email Address | View Details |
|---|---|---|
| Jane Smith | jane.smith@email.com | Survey Details |
| Mark Gold | mark.gold@email.com | Survey Details |
| Thomas Jefferson | thomas.jefferson@email.com | Survey Details |

[ Back ]

Fig. 18A

| Calendar | Event Campaign | Email Marketing | Promotional Material | Survey |

Survey Results

Ongoing Surveys

11/02/2014 Ideation to Scoping "Go No Go" Scoring

[Quick View] [Detailed View]

11/03/2014 Video Content Management

[Quick View] [Detailed View]

| 3.7 | 3.5 | 3.7 | 4.5 | 4.7 | 1.7 | 3.5 | 2.7 |
|---|---|---|---|---|---|---|---|
| Overall Average | Inside Strategy | General Feasibility | Financial Impact | Stats | Delivery | Marketing | Design/Display |

Completed Surveys

10/5/2014 Product Designs

[Quick View] [Detailed View]

10/13/2014 XYZ Principles of Management

[Quick View] [Detailed View]

User: Sam Church | Help | Log Out | My Order

Fig. 18C

User: Sam Church | Help | Log Out | My Order

*Calendar* *Event Campaign* *Email Marketing* *Promotional Material* *Survey*

10/23/2014 Video Content Management (SCORE SUMMARY)

| | Innovative | Technologically Reasonable | Time to Market! | Acceptable Risk | Profit Potential | Market Potential | Market Trading |
|---|---|---|---|---|---|---|---|
| Subtotal | 2 | 2 | 2 | 2 | 1 | 4 | 3 |
| Maximum Average | 7 | 8 | 3 | 9 | 0 | 3 | 3 |
| Average Score | 1 | 9 | 0 | 9 | 8 | 9 | 2 |
| Criteria Weight | 7 | 7 | 7 | 8 | 3 | 4 | 2 |
| Weighted Score | 7 | 5 | 1 | 1 | 1 | 1 | 9 |
| Max. Avg. Score | 8 | 5 | 6 | 3 | 2 | 3 | 2 |
| Weighted Avg. | 2 | 2 | 2 | | 4 | 3 | 1 |
| Average Score | 7 | | | | | | |
| Number of Votes | 22 | | | | | | |

Home    Back

Fig. 18D

MARKETING APPLICATION INCLUDING EVENT AND SURVEY DEVELOPMENT AND MANAGEMENT

TECHNICAL FIELD

This disclosure relates to managing and developing surveys in connection with marketing campaigns and events, and tools (e.g., systems, apparatuses, application software, methodologies, etc.) that provide a graphical user interface (GUI) in connection therewith.

BACKGROUND

In the current information age, use of information technology (IT) tools proliferate in all walks of life, including managing and generating information and data in business and industry. For example, various content authoring software are available to allow a user to generate information or content (such as marketing materials, e.g., marketing flyers, pamphlets, etc., for a particular marketing event) for a targeted audience. Other IT tools may be employed to facilitate distribution of the marketing materials by e-mail or mail to the targeted audience.

In the typical instance in marketing, the user must mentally and manually manage the collection and flow of marketing information, even if software tools are used by the user to assist with generation and transmission of the marketing materials and other content. That is, the user typically needs to use one software tool to generate text, another to generate graphical elements to be inserted in the material, yet another to compose the various information elements into a single presentation, another to create or assemble a distribution list using another software, etc. Further, such marketing materials typically require supervisory approval before distribution to the targeted audience, and therefore the marketing materials are provided to the supervisor electronically and/or in hardcopy form, and upon approval by the supervisor are distributed. However, a marketing professional who is familiar with a conventional process of putting together marketing material would appreciate that there are many more steps that must be performed manually and/or mentally, in such process.

Such process is cumbersome, even if software tools are available, since each software has its own interface and format, and the user must operate multiple interfaces and act as the integrator of the multiple tools.

Further, although a survey can be a useful marketing tool, it is compiled in a disparate process conventionally, and is typically not integrated in the tools for developing a marketing campaign or marketing event.

SUMMARY

This disclosure describes various tools (for example, a system, an apparatus, application software, a method or process, etc.) which are user-friendly and can be provided to assist a user to put together, organize and manage materials for marketing campaigns and/or events, including compiling a survey prior to, during or after a marketing event or campaign.

In an aspect of this disclosure, a marketing application is configured to provide the user with the tools to develop, organize and manage materials and maintain information for a marketing campaign or event and to create a survey, such as, for example, at the end of an agenda for the event. The materials and information for the marketing event (or campaign) is preferably maintained in a database that can be shared and accessed by various authorized user (e.g., campaign developers) and amongst the various aspects of the marketing campaign. Thus, a rich, event- or campaign-relevant survey can be readily developed.

Although the user generating a survey, in the case that the survey is related to one or more particular events, can access the information maintained for such event(s), the tools preferably permit the user to enter, or resume, a survey generation process while bypassing the event process, or at least without going through the entire event process. On the other hand, the survey may be created in association with a particular marketing campaign and not directed to any particular event(s), and in such instance, the tools would of course not require the user to undergo an event process in order to start or resume a survey creation process.

In another aspect, the aforementioned tools may be configured to form a microsite automatically when plural surveys have been created for a marketing campaign or event. Such microsite may be configured to allow a respondent to respond to each of the plural surveys, or access to the plural surveys may be selectively controlled, such as based on the context and/or based on the title, capacity or role of the respondent. Further, the tools may be configured to permit the user to control when a survey is to be made available.

In another aspect, in the case that a survey is associated with an event, the tools may be configured to permit an authorized user to access responses to the survey through the event process or workflow. Further, access to such response data may be by provisions similar to those provided to access response to event invitation, event feedback, etc. For example, access may via report generation provisions, and/or the user may be provided with a user interface for specifying the data to be included and/or a format of the report.

BRIEF DESCRIPTION OF THE DRAWINGS

The aforementioned and other aspects, features and advantages can be more readily understood from the following detailed description with reference to the accompanying drawings wherein:

FIG. 1A shows a block diagram of a system for marketing campaign development and management, according to an exemplary embodiment;

FIGS. 12A-12L show examples of user interface screens for a marketing application, according to an exemplary embodiment;

FIGS. 16A-16E show examples of user interface screens provided by a marketing application, according to an exemplary embodiment;

FIGS. 17E-17F show examples of user interface screens for a respondent to respond to a survey; and FIGS. 18A-18E show examples of user interface screens for an authorized user to access survey responses or response data, according to an exemplary embodiment;

DETAILED DESCRIPTION

Figure 1B:
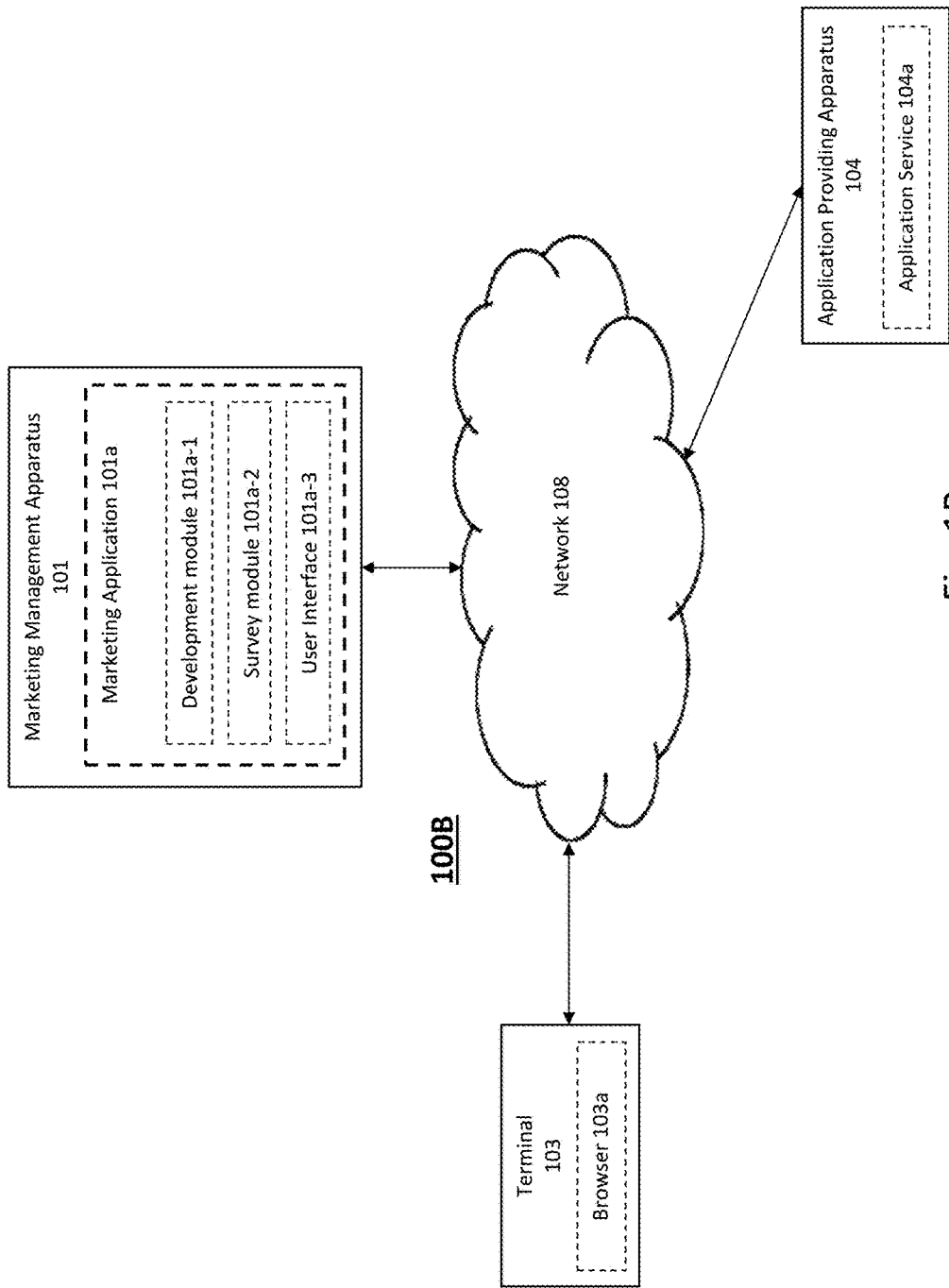
FIG. 1B shows a block diagram of a system for marketing campaign development and management, according to another exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

In this disclosure, various tools are discussed for providing a marketing application (also referred to as "marketing connection" or "marketing connection application" in this disclosure) to assist a user to manage, and put together materials for, marketing campaigns or events. It should be appreciated by those skilled in the art that a marketing connection application can be provided in any of various ways and thus while various examples are discussed herein, the inventive subject matter of this disclosure is not limited to such examples described herein.

Referring now to the drawings, wherein like reference numerals designate identical or corresponding parts throughout the several views, FIG. 1A shows schematically a system 100 for developing and managing marketing events, according to an exemplary embodiment of this disclosure. The system 100A includes a marketing management apparatus 101, a web service providing apparatus 102 and a terminal 103. The marketing management apparatus 101, the web service providing apparatus 102 and the terminal 103 are interconnected by a network 108.

The marketing database management apparatus 101 includes a marketing campaign or event development and management application 101a which in turn comprises a development module 101a-1 and a survey module 101a-2

The development module 101a-1 develops marketing events and stores information corresponding to the events. Further, the development module 101a-1 also causes any data or information (e.g. a list of marketing events created by the user) to be transmitted to the web service providing apparatus 102, which further relays and causes the transmitted information to be displayed to the user at the terminal 103. The development module 101a-1 can comprise one or more structural or functional parts that have or support a storage function. For example, the development module 101a-1 can be, or can be a component of, a source of electronic data, such as a web server, a backend server connected to a web server, an e-mail server, a file server, a multi-function peripheral device (MFP or MFD), a voice data server, an application server, a computer, a network apparatus, a terminal etc.

In addition, the development module 101a-1 (i) allows a user to specify a marketing object to be created for the selected marketing event, and specifies event-specific details specific to the selected marketing event to populate the marketing object for the selected marketing event; (ii) maintains a list of guests and invitees for the selected marketing event, and provides the list, upon request by the user, for user edit of the list of guests and invitees; (iii) allows a user to select a marketing template and populating the selected marketing template with event information maintained in the marketing object, for user selection of already-generated materials, for user modification of the populated marketing template and/or already-generated materials to form customized marketing materials for the selected marketing event, and for causing the customized marketing materials to be maintained in association with the marketing object for the selected marketing event; (iv) allows a user to edit one or more of the event-specific details, customized marketing materials and other associated event-specific information, for the marketing event; and (v) submits the marketing object, associated event-specific details, customized marketing materials and other associated event-specific information, for the marketing event, for approval by an event administrator.

The survey module 101a-2 creates a survey that may or may not be associated with the marketing event generated by the development module 101a-1. In a case that the survey is linked to or corresponds to a marketing event, several details from the marketing event are used for the survey. For example, the contact list for the marketing event is used in determining who is to receive the survey. In addition, multiple agendas may be associated with the survey. Further, once the survey is created and approved by an event administrator, the survey module 101a-2 generates a landing page (e.g., webpage). In the case that there is two or more surveys, the survey module 101a-2 generates multiple landing pages for each survey and links each landing page to a microsite which is created for this purpose. It should be noted that while multiple surveys may be associated with a single marketing event, the reverse is also possible. For example, an event may be staged in several cities (e.g., New York, Montreal, London, Paris, Berlin, etc.) and a common survey may be used for the multiple events. After the survey is submitted and completed by the participants of the event, the survey module may analyze the response received and output the statistical results to the user.

The web service providing apparatus 102 includes a web services 102a for providing various services to users of the system 100A, such as creating or deleting marketing events for a user, retrieving contents from the marketing database management apparatus 101, uploading or downloading files and other data to be used in connection with developing and managing marketing events, and etc. Such web services may also allow creating or modifying users, groups, templates for customizing marketing events, and etc.

The web service providing apparatus 102 can be configured in software or hosted on any computing device, including but not limited to a personal, notebook or workstation computer, a kiosk, a PDA (personal digital assistant), a MFD, a server, a mobile phone or handset, another information terminal, etc., that can communicate through the networks 108 and 109 with other devices. The web service providing apparatus 102 of this disclosure may be realized by a computer program product including a computer-usable, non-transient medium (such as a disk storage apparatus) having instructions embodied therein that are executed by a computer. Thus, it should be understood that the web service providing apparatus 102 may be executed on a computer. While the web service providing apparatus 102 is shown as being external to the terminal 103, the web service providing apparatus 102 may in fact be executed on the terminal 103.

Each of the marketing management apparatus 101, the web service providing apparatus 102 and the terminal 103 may include an internal storage unit therein and/or an external storage unit connected thereto, for storing various information and data generated or received via the network 108.

The terminal 103 may include a processing unit and a display unit, where the processing unit executes an application (e.g. web browser 103a) to cause the display unit to display the user interfaces provided by the marketing event creation part 102a. The terminal 103 is further described infra with reference to FIG. 6.

The terminal may be used by a participant of an event to view his or her emails or access websites on the Internet. Further, the terminal may be used to access, via browser 103a which is a program on the terminal 103, a microsite, corresponding to one or more surveys of the event, which includes one or more links to landing pages that contain the one or more surveys.

It should be appreciated that while only the terminal 103 is shown in the example of FIG. 1A, the system 100 can include more terminals. Indeed, the document management system of this disclosure is preferably configured to be scalable such that terminals can be added to the system as desired and needed (e.g. to serve more users).

The network 108 can be a local area network, a wide area network or any type of network such as an intranet, an extranet (for example, to provide controlled access to external users, for example through the Internet), a private or public cloud network, the Internet, etc., or a combination thereof. In addition, the network 108 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

FIG. 1B shows schematically a system 100B, according to another exemplary embodiment. The system 100B is similar to the system 100A of FIG. 1A except that the marketing management apparatus 101 additionally includes a user interface 101a-3 and the system additionally includes an application providing apparatus 104a.

The user interface 101a-3 is included in the marketing application 101a and allows the user to access the features offered by the development module 101a-1 and the survey module 101a-2 via a graphic user interface (GUI).

The user interface 101a-3 allows the user to create one or more marketing events and event agendas corresponding to the marketing event via the development module 101a-1. The information used to generate the marketing event and anything related to the marketing event may be captured in a marketing event object. Further, the user interface 101a-3 allows the user to create event surveys to be distributed to participants of the marketing event by letting the user create, for the event survey, a variety of question types (e.g., multiple choice, open-ended, checkboxes, ordinal, etc.) and their corresponding answer choices. The user interface 101a-3 also permits the user the user to specify a start and end date for the survey. The start date may correspond to a date in which potential participants of the survey may be allowed access to the survey in order to complete it. The end date may correspond to a date in which the potential participants of the survey may no long have access to the survey. Further, the surveys may be generated, via the survey module 101a, based on information from the marketing event object or by itself without any connection to any marketing event.

The application providing apparatus 104 includes an application services 104a for providing application services to users of the system 100B, such as creating or deleting marketing events for a user, retrieving contents from the marketing management apparatus 101, uploading or downloading files and other data to be used in connection with developing and managing marketing events, and etc. Such applications may also allow creating or modifying users, groups, templates for customizing marketing events, and etc.

The application providing apparatus 104 can be configured in software or hosted on any computing device, including but not limited to a personal, notebook or workstation computer, a kiosk, a PDA (personal digital assistant), a MFD, a server, a mobile phone or handset, another information terminal, etc., that can communicate through the networks 108 and 109 with other devices. The application providing apparatus 104 of this disclosure may be realized by a computer program product including a computer-usable, non-transient medium (such as a disk storage apparatus) having instructions embodied therein that are executed by a computer. Thus, it should be understood that the web service providing apparatus 102 may be executed on a computer. While the application providing apparatus 102 is shown as being external to the terminal 103, the web service providing apparatus 104 may in fact be executed on the terminal 103.

Otherwise, operations of the elements of the system 100B are similar to those discussed in connection with the corresponding elements of the system 100A of FIG. 1A.

Figure 2A:
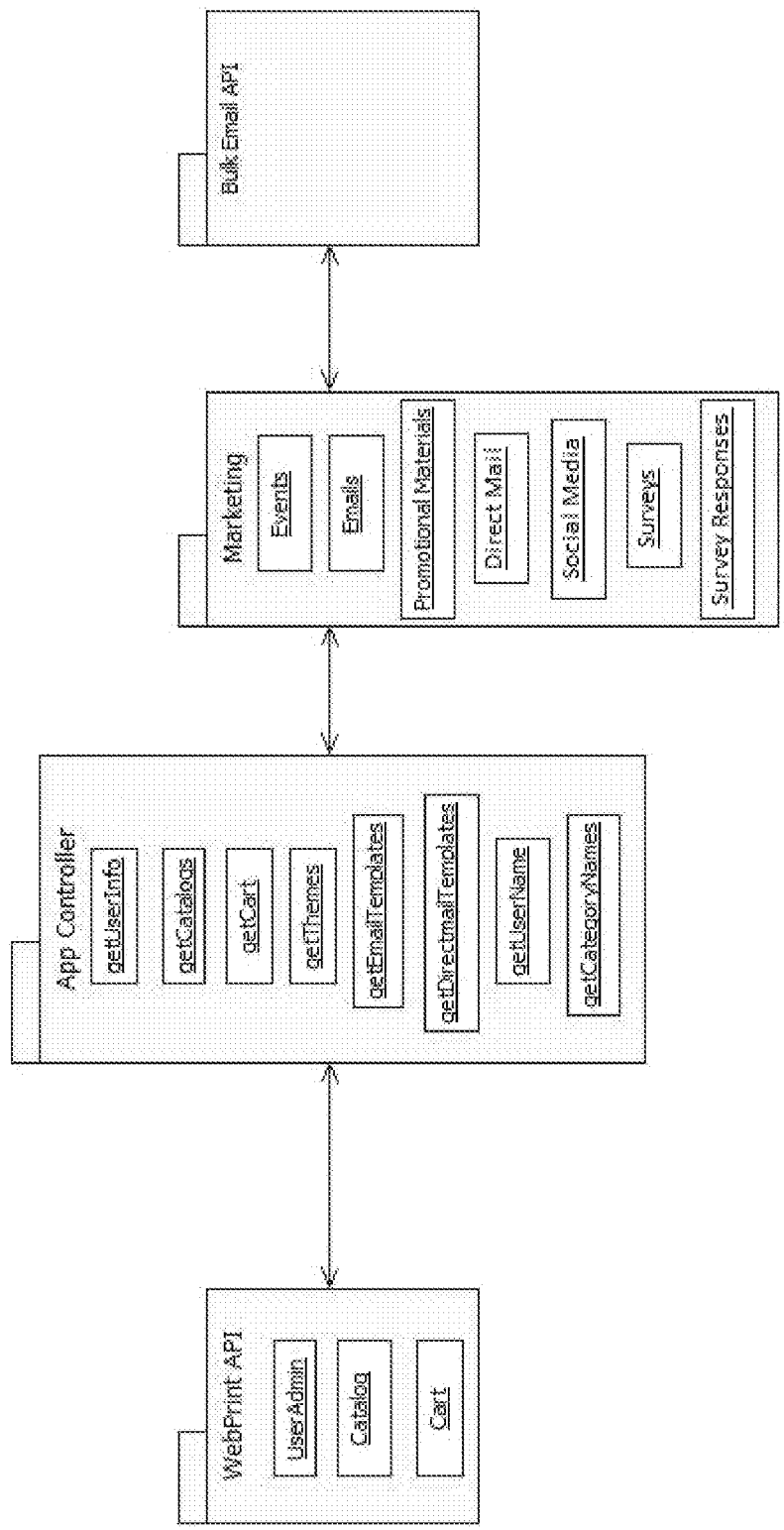
FIG. 2A shows a schematic view illustrating, at a high-level, a configuration of a marketing application that can be provided in either the system of FIG. 1A or the system of FIG. 1B.

Such a marketing application provided in the system of FIG. 1A or in the system of FIG. 1B can be configured as shown in FIG. 2A. The software system for providing the marketing connection application includes a front end ("Marketing" in FIG. 2A) that controls the marketing connection application (including user interface and functions) provided to the user. Such front end provides a calendar functionality (discussed infra) which shares a schedule database with other portions of the marketing connection application, and the front end additionally includes an events controller ("Events" in FIG. 2A and "Events Controller" in FIG. 2B) for an event campaign process, an emails controller ("Emails" in FIG. 2A and "Emails Controller" in FIG. 2C) for an email marketing campaign process, and a promotional materials controller ("Promotional Materials" in FIG. 2A and "Directmails Controller" in FIG. 2D) for a direct mail campaign process. In the example shown in FIG. 2A, the user the marketing connection application allows the user to select any of various different work flows (as discussed infra with reference to FIG. 7), e.g., event development, email campaign and direct mail campaign, but the user may of course switch from one work flow to another or employ a combination of work flows to adapt the campaign in the manner as desired. In addition, the system may include a social media controller ("Socialmedias Controller" in FIG. 2E) as an add-on to allow the user to employ another mode of marketing delivery for the campaign. Each of the aforementioned software controllers (e.g., events controller, emails controller, promotional materials controller, social media controller) is discussed in turn infra.

Further, the front end is configured to access an application-programming interface (API) of an email application for bulk email, to allow the user to send emails to contacts or other destinations specified, for example, in a mailing list or some other database containing contact information for customers, invitees or other targeted audience. Such use of email may be employed not only in (of course) an email campaign, but also to communicate invitations, event updates, content of promotional materials that are transmitted by direct mail and/or e-mail, etc., or otherwise initiate a contact process (e.g., invitation to register at a Landings Page).

In addition, the front end is integrated with an application controller ("App Controller" in FIGS. 2A-2D) which operates automatically as a back-end to interface with databases, external applications, etc. The interface between the application controller and the external application may be based on XML script or Javascript query (i.e. get function) and comport with JSON (JavaScript Object Notation) for data interchange.

In the example shown in FIG. 2A, the application controller accesses a print application ("WebPrint") API in order to obtain various functionalities that may be provided by such external application. In this example, the application controller is configured to include various functions (such as "getUserinfo", "getUserName", "getCatalogs", "getCart", "getThemes", "getEmailTemplate", "getDirectmailTemplate", "getCategoryNames", etc.) that allow the marketing connection application to inure the benefits of the functionalities (e.g., user administration for authentication and access control, catalog of pages and objects such as themes and templates, cart for ordering selected content/objects, etc.) that exist in the external application. Such approach is transparent to the user and provides improved 5 convenience and overall operability to the user so that the user need not exit the marketing connection application to obtain the functionalities of the external application, nor does it require the user to struggle to devise a workflow to import content into the marketing connection application from the external application.

Figure 2B:
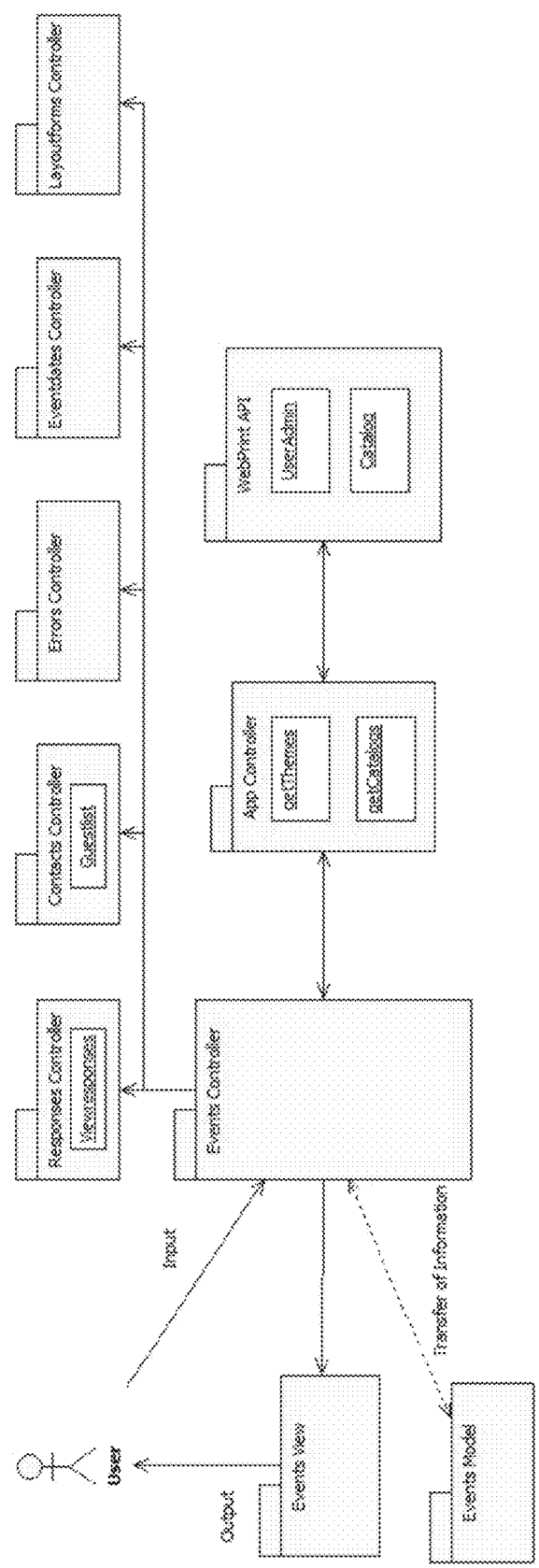
FIG. 2B shows a schematic view of an events controller of the marketing application of FIG. 2A.

In the example of the WebPrint application, there are various functionalities and contents that a typical user of the marketing connection application may find useful. In the case of developing an event campaign, as discussed in more detail infra, a typical marketing connection application user might find it helpful to maintain a consistent theme (e.g., colors, borders, graphics, etc.) across the materials provided to the audience. The external application may provide a library ("Catalog" in FIGS. 2A and 2B) of such themes that permits the user to select and retrieve a desired theme from the library, without requiring the user to waste valuable creative resources towards creating a theme from scratch, when it can be readily obtained from the library. Likewise, the user may find other objects that might be useful to jump-start or enrichen the event campaign from the catalog of such objects provided by the external application. As shown in FIG. 2B, the events controller is configured to invoke, inter alia, the aforementioned getThemes and getCatalogs functions, in order to enable the event campaign to avail itself of useful functionalities of the WebPrint application. Further, the user can deploy a shopping cart functionality ("Cart" in FIG. 2A) of WebPrint, from within the marketing connection application, to place selected objects in the cart and defer checkout (or ordering) until a later time.

Further, as discussed further infra, the marketing connection application maintains a collection of templates and models, and a typical user may very well find the use of models and templates to be helpful to accelerate event development, particularly when certain aspects are consistently present in most, if not all, events. Further, use of models and templates allows, when appropriate, a marketing department to standardize its presentations, although a user of the marketing connection application is by no means locked down to a fixed presentation approach.

As mentioned above, the events controller is a component of the front end of the marketing connection application, and it is largely responsible for controlling, with reference to event campaign models ("Events Model" in FIG. 2B), a process and user interface for the event campaign ("Events View" in FIG. 2B). Various features of the marketing connection application are useful to the typical user for developing the event campaign, and the tasks for providing such features are subdivided and allocated to subcontrollers (e.g., "Responses Controller", "Contacts Controller", "Errors Controller", "Eventdates Controller", "Layoutforms Controller", as shown in FIG. 2B).

For example, the Eventdates subcontroller accesses the schedule database that is commonly shared and used by the calendar functionality of the marketing connection application, and provides required date/schedule information when an event is being created, when event details are being reviewed and/or modified, when other tasks require date/schedule data, etc.

The Contacts subcontroller includes a Guestlist function that, for each event, provides a user interface ("Events View" in FIG. 2B) for generating, compiling and/or editing a guest list for the event and maintains the guest for the event.

The Layoutforms subcontroller operates to retrieve the appropriate form data (e.g., a model, a template, etc.) from the marketing database, and cause the retrieved form data to be reflected in the user interface, for various steps in the event campaign (such as, for example, create event, generate event agenda or topics, customize registration, customize event materials, review event details, finalize and submit event/materials for approval, etc.).

The Responses subcontroller operates to provide a user interface through which a user can view responses to the event invitation. Such response may be a reply e-mail, a response entered via a Landings page, a scanned image of a mailed response, etc.

The Errors subcontroller performs a consistency check, as a background process, of the event campaign data, and when appropriate, causes an error message to be displayed through the user interface. Such message may require the user to modify the current data for the event, and/or indicate that a default data conflict rule will be applied, and/or indicate the corrected data.

Figure 2C:
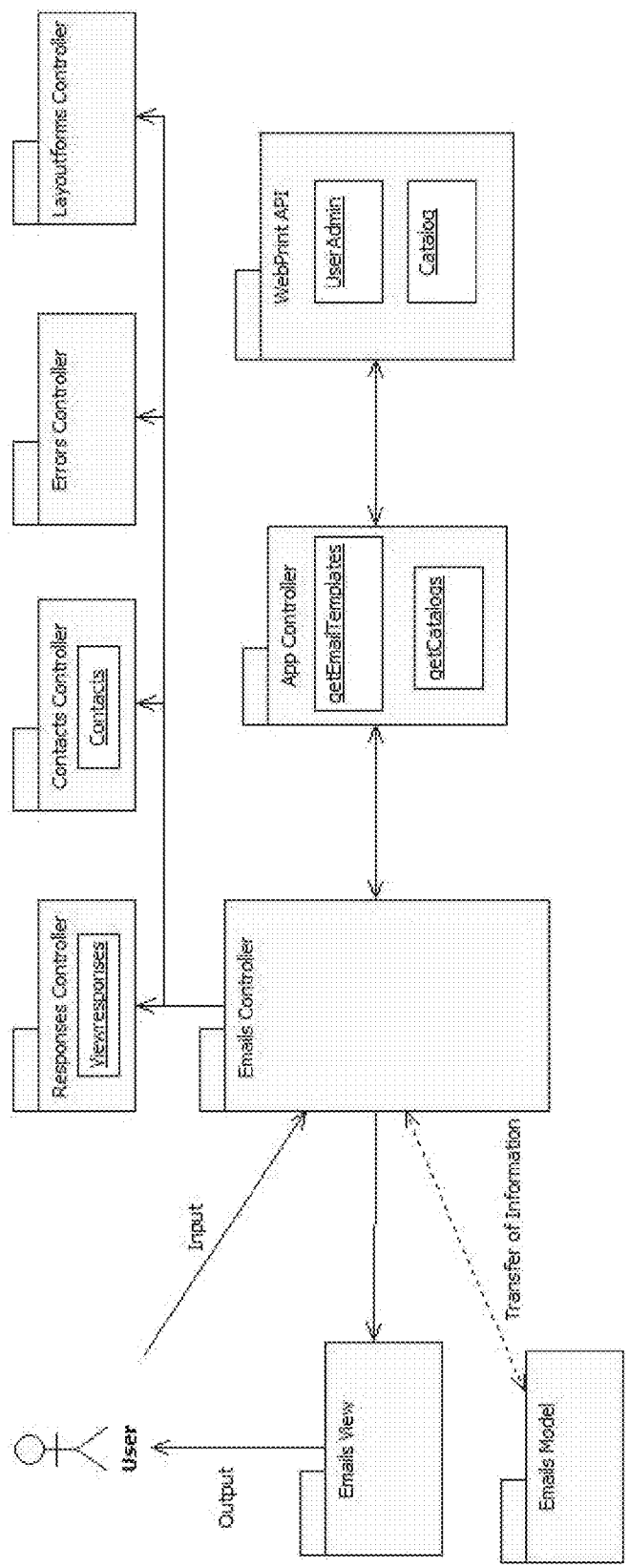
FIG. 2C shows a schematic view of an emails controller of the marketing application of FIG. 2A.
Figure 2D:
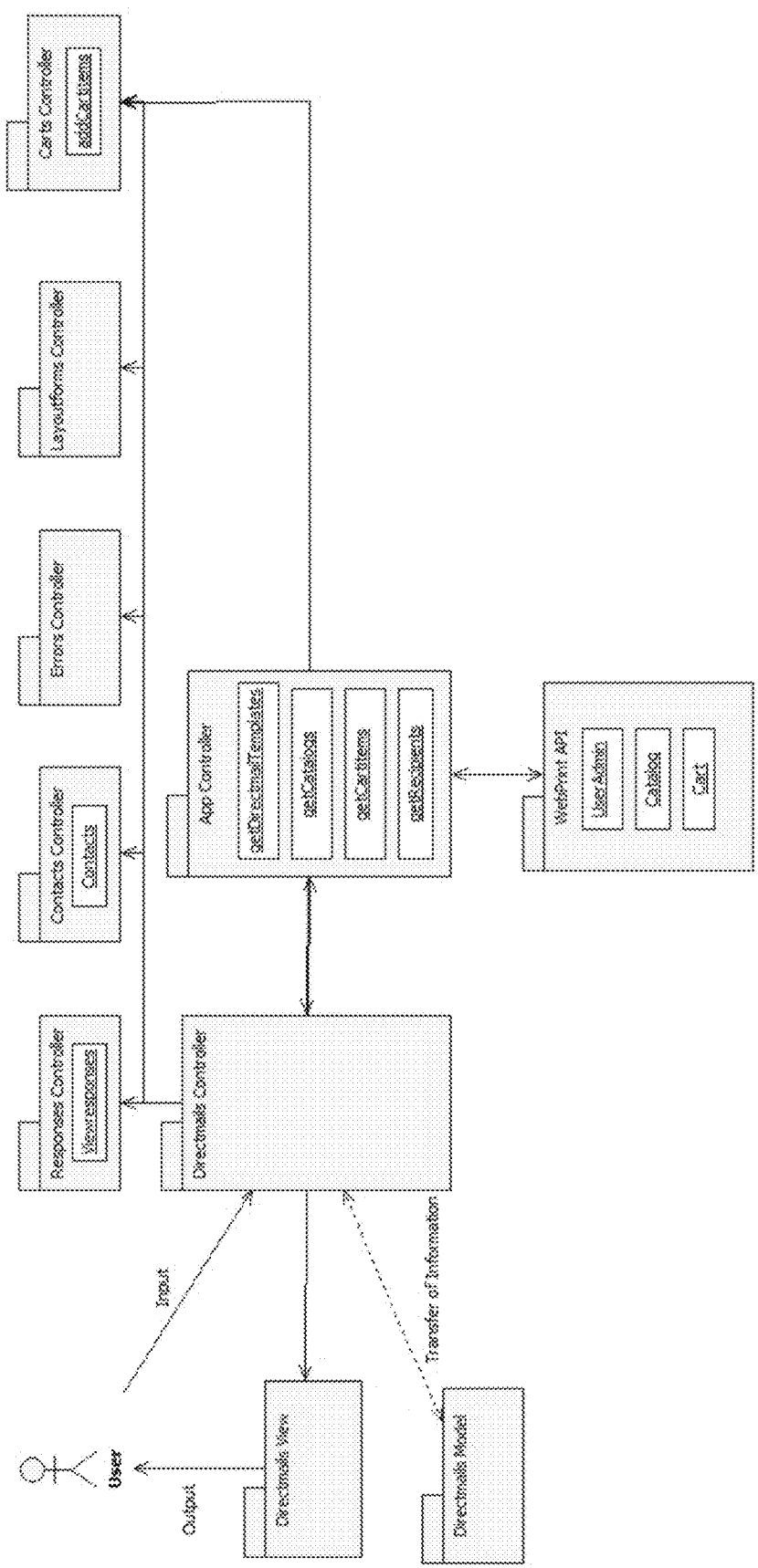
FIG. 2D shows a schematic view of a direct mails controller of the marketing application of FIG. 2A.
Figure 2E:
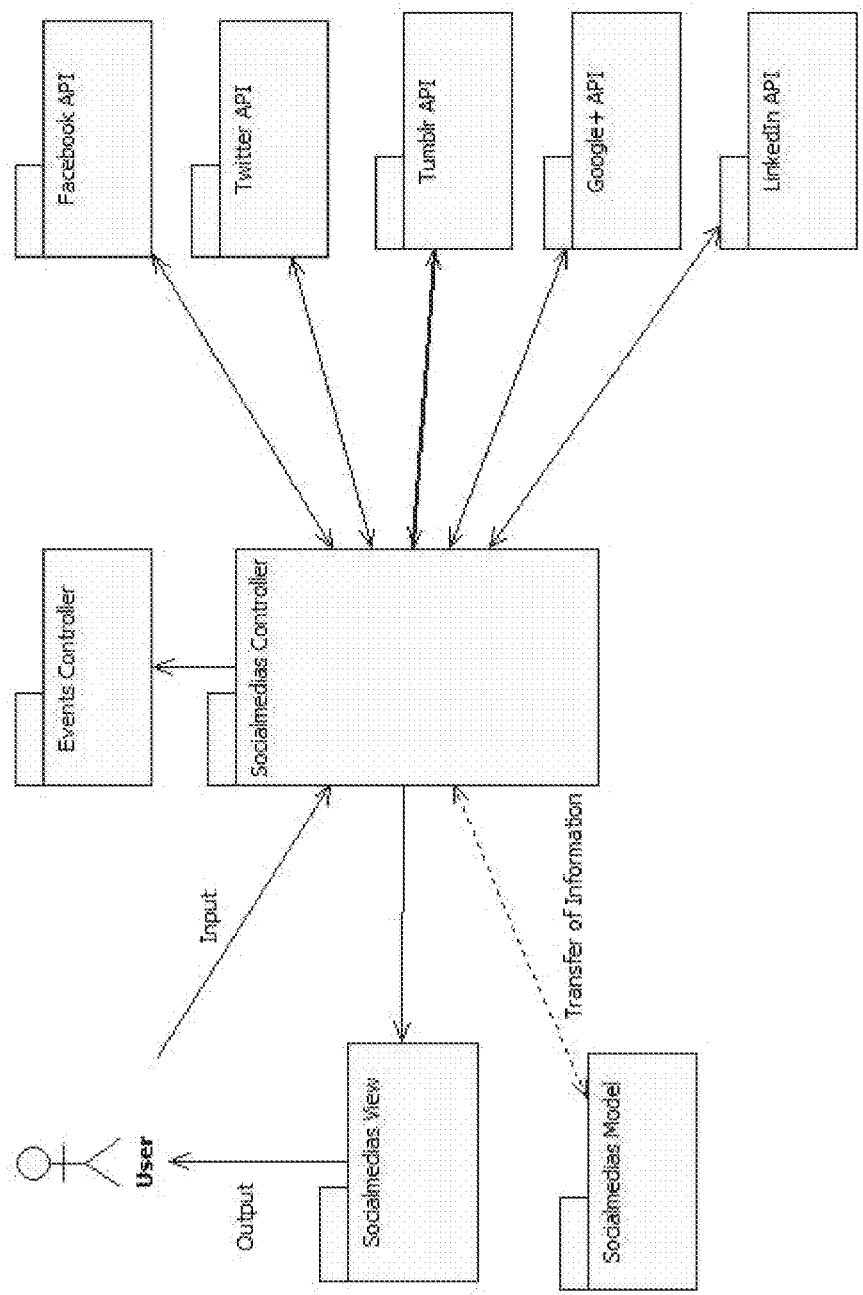
FIG. 2E shows a schematic view of a social media controller that can be included in a modified configuration of the marketing application.

As discussed further infra, the events controller may be provided with an interface to various social media, such as shown in FIG. 2E. The social media interface includes a social media controller ("Socialmedias Controller" in FIG. 2E) which is configured to operate through an appropriate API (e.g., "Facebook API", "Twitter API", "Tumblr API", "Google+ API", "LinkedIn API", etc.) of the corresponding social media to allow the user to post selected materials onto the particular social media. That is, the social media controller operates, with reference to social media models ("Socialmedias Model" in FIG. 2E), to provide a suitable user interface for the particular social media ("Socialmedias View" in FIG. 2E). As should be appreciated by those skilled in the social media art, user/app credentials will typically be needed in order to post materials to an assigned social media page. Such user information (e.g., user ID, user credentials, customer key, etc.) are registered in the social media models and provided at an appropriate timing and in an appropriate format, as needed.

The emails controller, like the events controller, includes a Responses subcontroller ("Responses Controller"), Contacts subcontroller ("Contacts Controller"), Errors subcontroller ("Errors Controller"), Layout subcontroller ("Layoutforms Controller"), as shown in FIG. 2C, which operate to control, with reference to email campaign models ("Emails Model" in FIG. 2C), a process and user interface for the email campaign ("Emails View" in FIG. 2C). Such subcontrollers have functionalities that are similar to their respective counterparts in the events controller, but the presentation and the underlying data is somewhat different. For example, the Contacts subcontroller of the emails controller provides a Contacts function that is, of course, not event-specific but rather can be a mailing list used for one or more campaigns, and modified upon demand.

Further, the emails controller employs a getEmailsTemplate function of the App Controller to obtain one or more email templates from the external application (e.g., WebPrint API in the example of FIG. 2C), instead of the GetThemes function of the App Controller. Further, the promotional materials controller for a direct mail campaign process (FIG. 2D) is similar in many ways to the emails controller, but is different in a few aspects. The promotional materials controller operates to control, with reference to direct mail campaign models ("Directmails Model" in FIG. 2D), a process and user interface for the direct mail campaign ("Directmails View" in FIG. 2D). In addition to a Responses subcontroller ("Responses Controller"), Contacts subcontroller ("Contacts Controller"), Errors subcontroller ("Errors Controller"), Layout subcontroller ("Layoutforms Controller"), there is additionally provided a Carts subcontroller ("Carts Controller"), to control import of objects from the WebPrint application via the getCartitems function of the App Controller. Such additional provisions is available in the example of FIG. 2D because it was found that in direct mail campaigns, users more often (than in an email campaign or event campaign) resorted to objects from external applications (such as WebPrint) and moreover such user typically submitted jobs through the print application when the promotional materials were finalized (and approved). The promotional materials controller employs a getDirectmailsTemplates function and getRecipients functions, in addition to getCartitems and getCatalogs function, of the App Controller. The getRecipients function allows the user of the marketing connection application to supplement contacts data with data maintained in the WebPrint application of recipients to whom past jobs were delivered.

Figure 3:
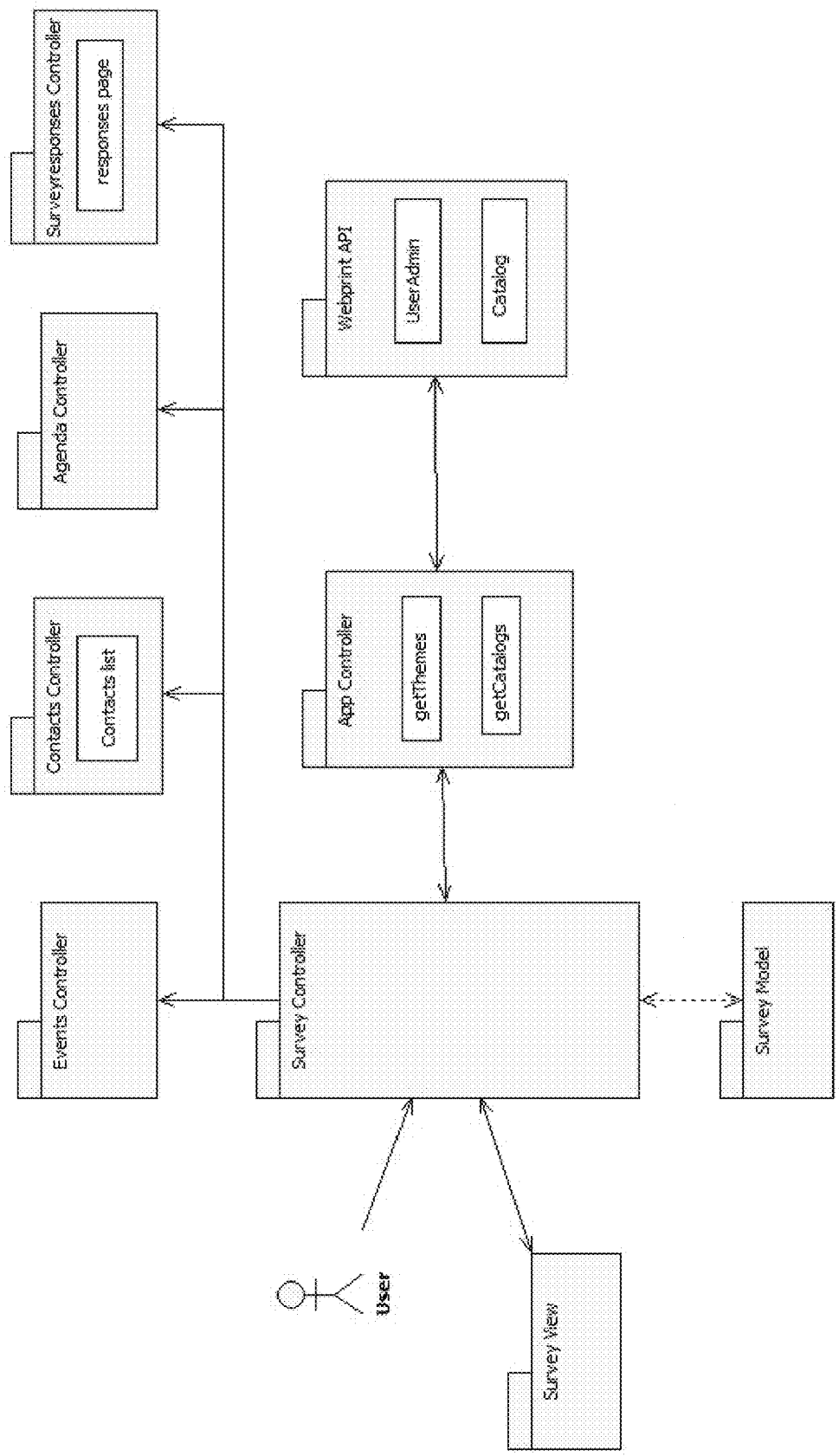
FIG. 3 shows a schematic view of a survey controller for the marketing application, in accordance with an exemplary embodiment.
Figure 4:
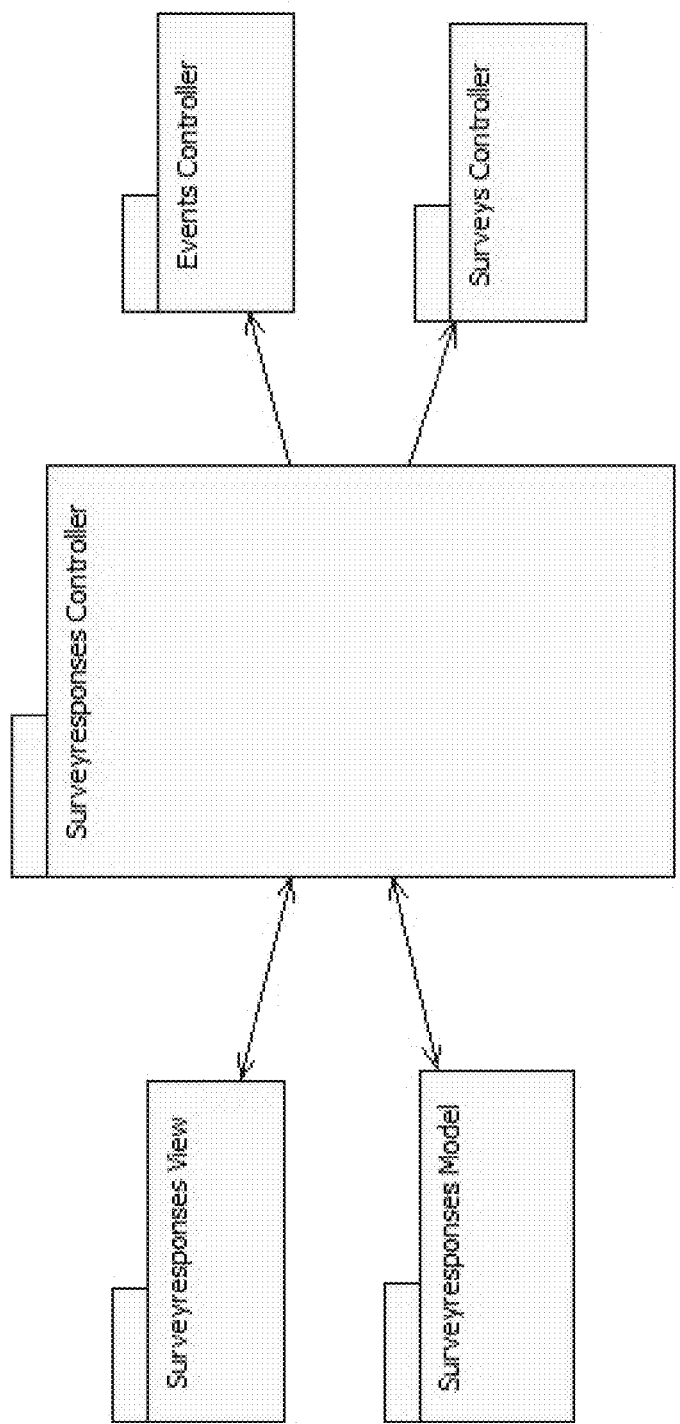
FIG. 4 shows a schematic view of a survey responses controller of the marketing application, in accordance with an exemplary embodiment.

The survey controller ("Survey Controller"), as shown in FIGS. 3 and 4, is similar to the events controller of FIG. 2B but includes additional features such as an agenda controller ("Agenda Controller"), and a surveyresponses controller ("Surveyresponses Controller"). The survey controller is largely responsible for controlling, with reference to a survey model ("Survey Model"), a process for creating a survey that may or may not be associated with a marketing event. The agenda controller may permit a user create one or more agendas for the marketing event. Further, the user may through a user interface ("Survey View") create or edit one or more surveys that may be assigned for each agenda. Then, after the user has finished creating one or more surveys, they are been distributed to the potential participants of the survey. Once the completed surveys from the participants have been collected, the surveyresponses controller analyzes the results and presents them to the user (via a "response page").

Figure 5:
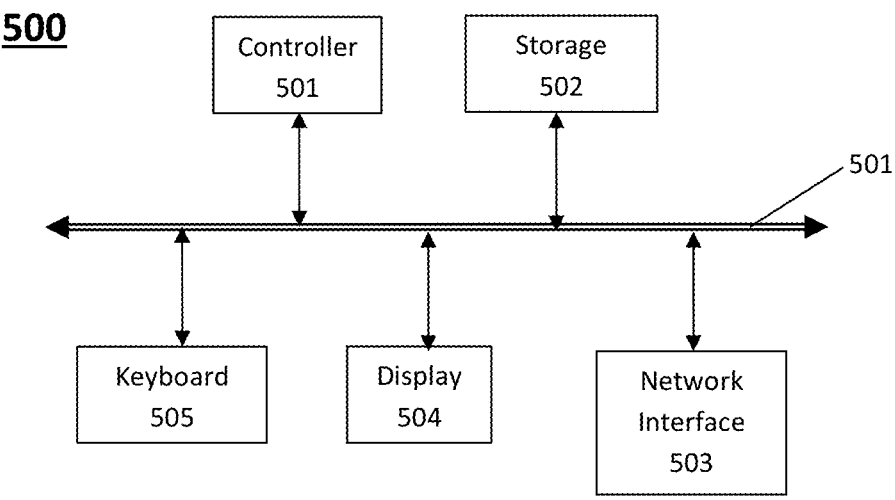
FIG. 5 shows a block diagram of an exemplary configuration of a marketing management apparatus (e.g., FIG. 1A or FIG. 1B) or web service providing apparatus (e.g., FIG. 1A) or application providing apparatus (e.g., FIG. 1B)

FIG. 5 shows an exemplary constitution of a computing device that can be configured (for example, through software) to operate (at least in part) as the marketing management apparatus 101 of FIG. 1A or FIG. 1B, or the web service providing apparatus 102 of FIG. 1A, or the application providing apparatus 104 of FIG. 1B. As shown in FIG. 5, apparatus 500 includes a controller (or central processing unit) 501 that communicates with a number of other components, including memory or storage part 502, network interface 503, display 504 and keyboard 505, by way of a system bus 509. The management apparatus 500 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management apparatus 500, the controller 501 executes program code instructions that control device operations. The controller 501, memory/storage 502, network interface 503, display 504 and keyboard 505 are conventional, and therefore in order to avoid obfuscating the inventive aspects of this disclosure, such conventional aspects will not be discussed in detail herein.

The management apparatus 500 includes the network interface 503 for communications through a network, such as communications through the network 108 with the terminal 103 in FIG. 1A. However, it should be appreciated that the subject matter of this disclosure is not limited to such configuration. For example, the management apparatus 500 may communicate with client terminals through direct connections and/or through a network to which some components are not connected. As another example, the management apparatus 500 does not need to be provided by a server that services terminals, but rather may communicate with the devices on a peer basis, or in another fashion.

The web service providing apparatus or the marketing connection service providing apparatus of the present disclosure is not limited to a server or computer, but can be manifested in any of various devices that can be configured to communicate over a network and/or the Internet.

Figure 6:
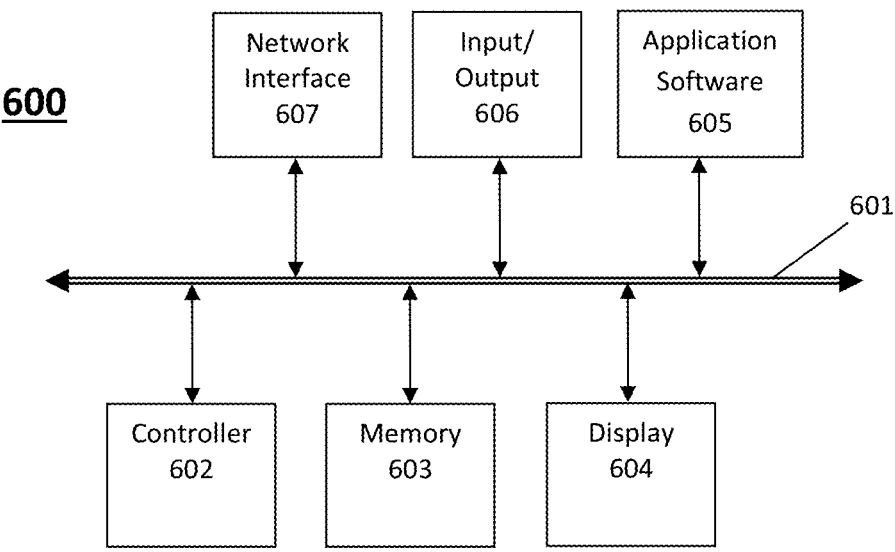
FIG. 6 shows a block diagram of an exemplary configuration of a terminal, such as illustrated in FIG. 1A, according to an exemplary embodiment.

An exemplary constitution of the terminal 103 of FIG. 1A (for example, as a computer) is shown schematically in FIG. 6. In FIG. 6, computer 600 includes a controller (or central processing unit) 602 that communicates with a number of other components, including memory 603, display 604, application software 605, input/output (such as keyboard, mouse, touchpad, stylus, microphone and/or speaker with voice/speech interface and/or recognition software, etc.) 606 and network interface 607, by way of an internal bus 601.

The memory 603 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 607 provides a connection (for example, by way of an Ethernet connection or other network connection which supports any desired network protocol such as, but not limited to TCP/IP, IPX, IPX/SPX, or NetBEUI) to the network to which the computer 400 is connected (e.g. network 108 of FIG. 1A).

Additional aspects or components of the computer 600 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 7:
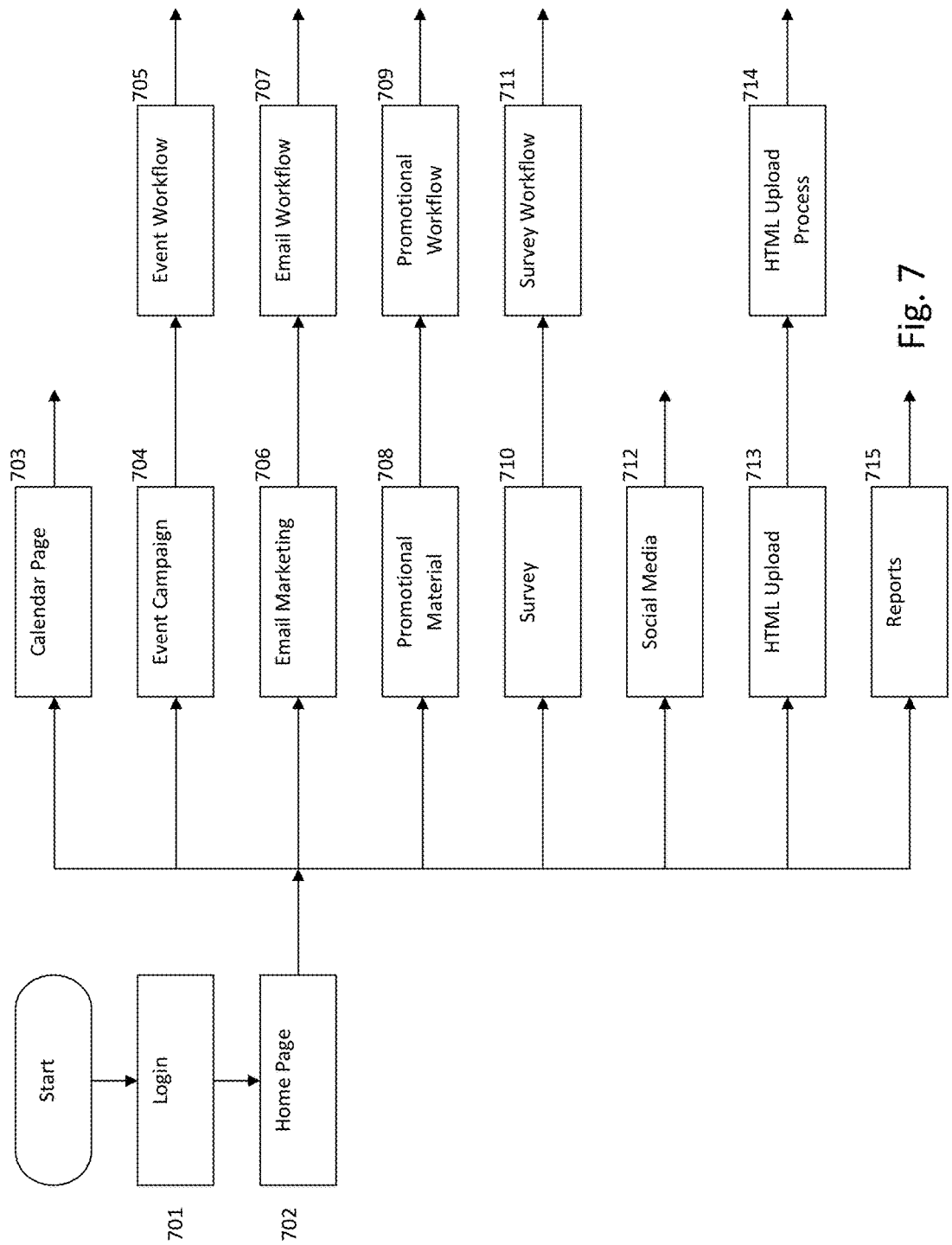
FIG. 7 shows a schematic view of workflow options in a marketing application.

FIG. 7 shows workflow options in the marketing application 101a, for creating an event, according to an exemplary embodiment.

After starting the marketing application, a user logins in to his or her account (701). Next, the user is presented with a home page of the marketing application (702). Here the user may have a variety of options to select from.

The user may select a calendar option to create a calendar page which assists in scheduling events (703). The user may select to create an event campaign (704) which causes an event campaign process (705) to begin. In this case, the user can organize a meeting or conference by sending out save the date, invitations and reminders in the form of email and print materials. If the user has a guest list, the materials can be personalized. The user can mark the attendees during the event. Once the event is complete, the user can check the attendees for the event and send out "Thank You" emails or "Thank You" postcards. The user may select to create an email campaign (706) which causes an email campaign process (707) to begin. In this case, the user may select a template for the email, upload a list which includes the target recipients and scheduling the sending date of the email. The user may select to create promotional material (708) for the event which causes a promotional material process (709) to begin. In this case, the user may put together materials required during the event. The user can select the design for banners, postcards, pens or any other material required during the event. The user may select to create a survey (710) causing the survey process to begin (711). The user may select to utilize social media for promoting the event (712). This may be performed via television, newspapers, internet, smartphone applications, etc. The user may select to upload HTML files (713) which causes a HTML upload process to being (714). These HMTL files may correspond to a page for a website of the event. The user may select to view reports for surveys corresponding to the event (715).

Figure 8:
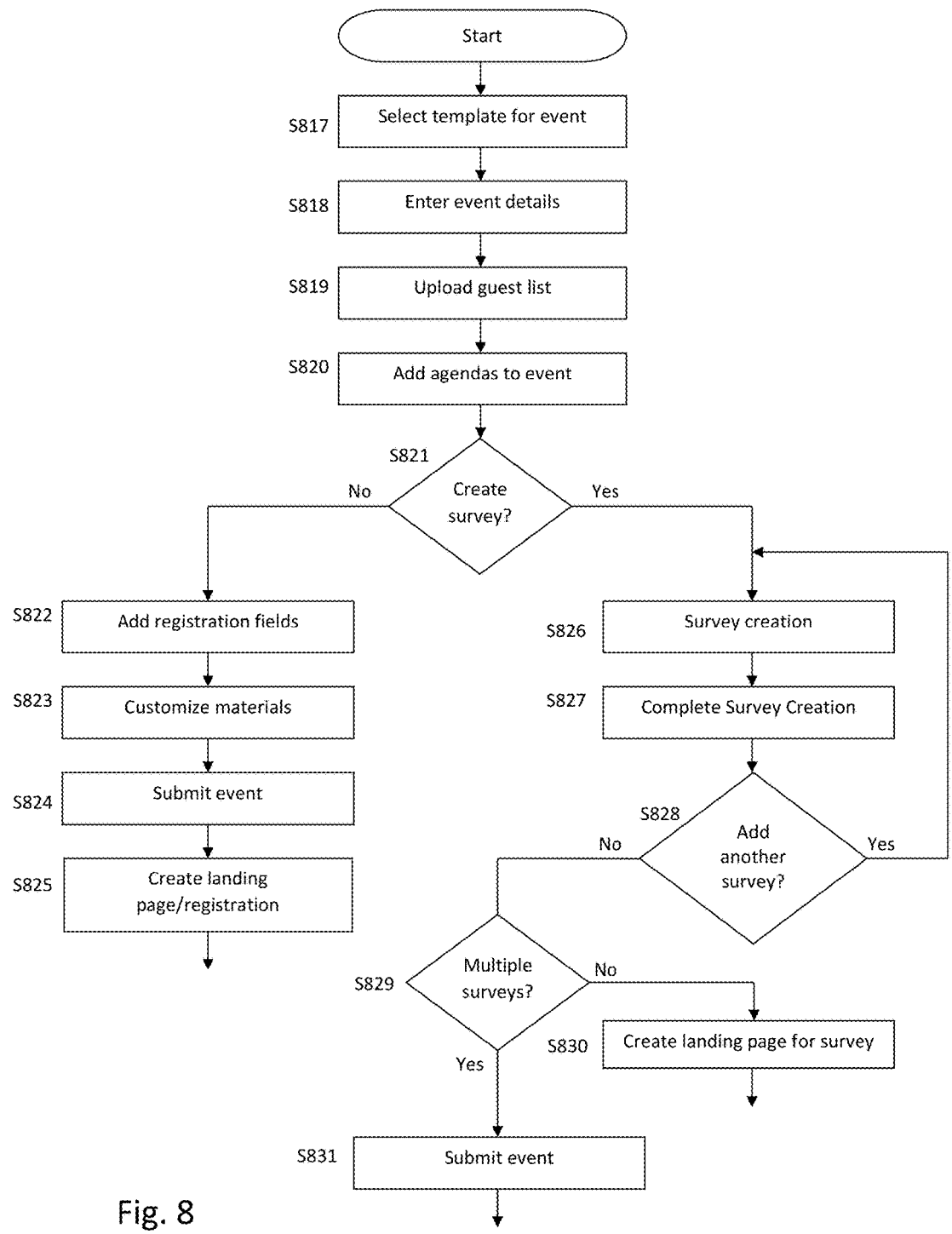
FIG. 8 shows a flow chart of a workflow in which a survey is created within an event process of a marketing application, according to an exemplary embodiment

FIG. 8 show a process performed by a marketing application (e.g., 101a), for creating an event and a survey associated with the event, according to an exemplary embodiment.

First, the user enters the details (step S818) of the event (e.g., event name, requester name, requester email, event description, start date, end date, date and time of the event, location name, phone number, address, etc.). Then the user uploads a guest list that contains names and contact information for potential participants of the event (step S819). Next, the user enters one or more agendas for the event (step S820). The agendas may be sub-events (e.g., guest speakers, contests, raffles, product unveiling, etc.) within the event.

Then the marketing application determines whether a survey associated with the event is to be created or not (step S821). In the case that no survey is to be created (step S821, no), the user is prompted to customize information fields of a registration page (e.g. a page via which participants register for the marketing event). Afterwards, the user can customize materials (e.g. invitation, save-the-date, reminder, thank-you note, etc.) for the event (step S823). When the user is finished with creating the event, he or she submits it (step S824) and a landing page corresponding to the event is created (step S825).

On the other hand in the case that a survey associated with the event is to be created (step S821, yes), the user begins the process for survey creation (step S826) and completes the survey (step S827). Next, the marketing application determines whether more surveys are to be created (step S828). In the case that more surveys are to be generated (step S828, yes), the process repeats itself. On the other hand, in the case that no more surveys are to be generated (step S828, no), the marketing application determines whether there are two or more surveys that were created (step S829). In the case that there are two or more surveys (step S829, yes), the event is submitted (step S831). In the case that there is a single survey (step S829, no), a landing page for the survey is created (step S830).

Figure 9:
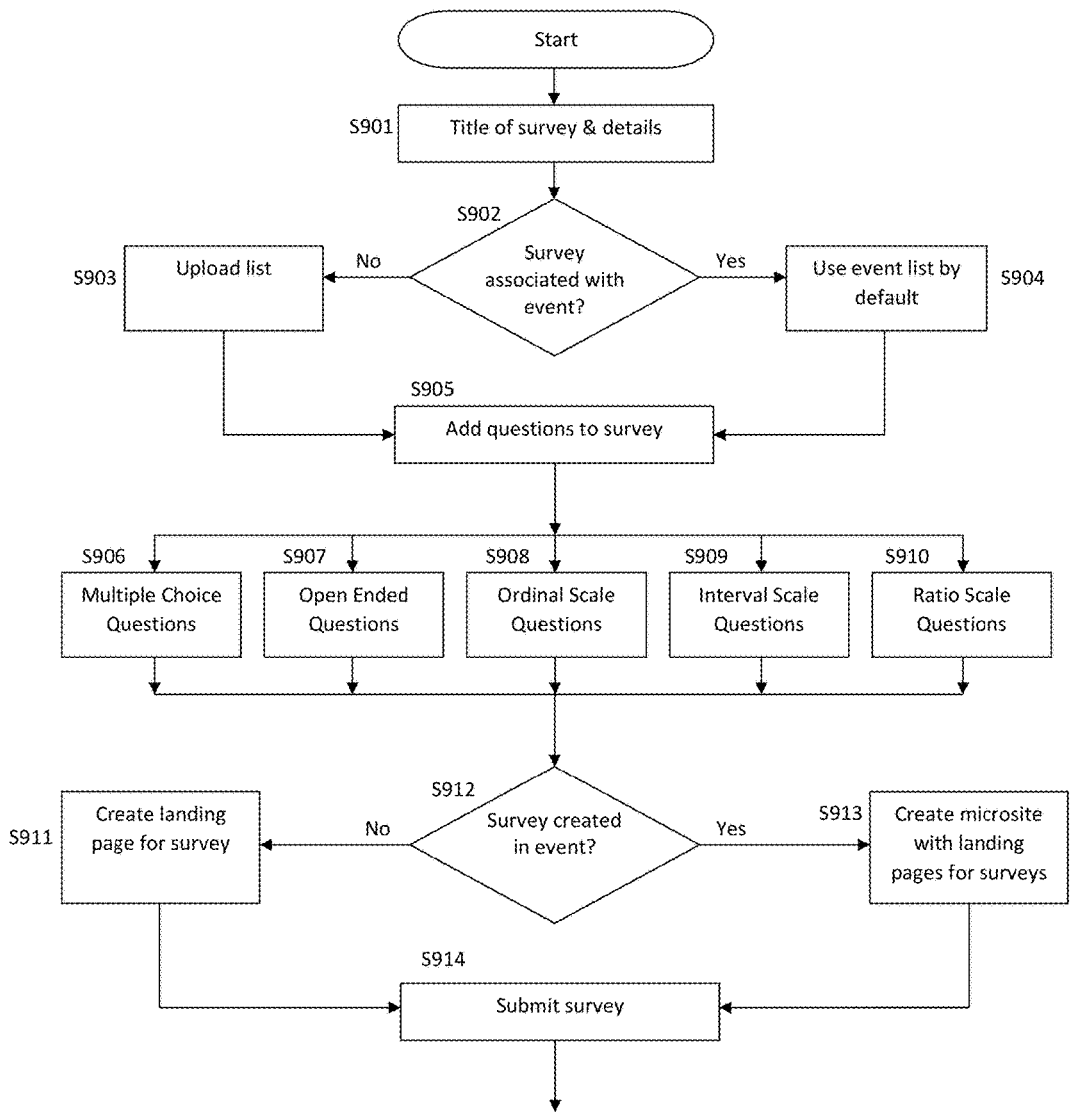
FIG. 9 shows a flow chart of a workflow to create a survey, according to another exemplary embodiment.

FIG. 9 show a process performed by a marketing application (e.g., 101a), for creating a survey that may or may not be associated with an event, according to an exemplary embodiment.

After starting a marketing application, a user inputs information corresponding to the survey (e.g., title, details, etc.). Next, the marketing application determines whether the survey is to be associated with event (step S902). In the case that the survey is not associated with an event (step S902, no), the marketing application prompts the user to upload a contact list that contains information on who is to receive the survey (step S903). On the other hand, in the case that the survey is associated with an event (step S902, yes), a contact list for the potential participants of the event is used as a contact list for the participants of the survey (step S904). Next, one or more different types of questions are added to the survey (step S905).

One type of question that can be added to the survey is a multiple choice question type (step S906). In this case, the survey participants are asked a question and can only select one answer from two or more pre-selected answer choices (e.g., "What is your favorite' U.S. state"). Another type of question is an open ended question (step S907). In this case, the survey participants are asked a question and is given the option to answer the question however they wish. In other words, the survey participants can respond with more than one word and there are no pre-selected answer choices (e.g., "What did you think about our product?"). As for ordinal scale questions (step S908), survey participants are asked to rank a list of items or select from an ordered set (e.g., "Please rank the following agendas from most important to least important"). In interval scale questions (step S909), survey participants are given a scale with equal intervals between each elements of the scale and are asked to rate selected answer choices with respect to that scale (e.g. "Please rate, as 'Poor', 'Good' or 'Great', the following items"). Ratio questions types are questions which ask for responses that are measurable (step S910). In other words, the answer choice is objective and can be verified (e.g., "How many days do you work in a year?").

After the user has selected, the question types and create response to them, the marketing application determines whether the survey was created as part of an event (step S612). In the case, that the survey is not associated with an event (step S612, no), a landing page for the survey is created (step S613). On the other hand, in the case that the survey is associated with an event (step S612, yes), the survey is placed on a microsite which contains all surveys associated with the event (step S614). After the landing page is created (whether by itself or on a microsite), the survey is submitted (step S615).

It should be noted that a landing page which contains the survey may be a web page that may be on a website. In other words, potential participants of the survey may access the survey by typing in a Uniform Resource Locator (URL) that corresponds to the landing page. Further, a microsite may host multiple landing pages with each containing a survey. In one embodiment, a microsite may be a website that is generated when multiple surveys are created. As a result, multiple surveys corresponding to that marketing event may be placed in landing pages that are then connected with the microsite. In another embodiment, the microsite forms part of a website. For example, when an organization creates a marketing event, it uses a portion of the website to create a microsite which then contains the survey landing pages.

Figure 10:
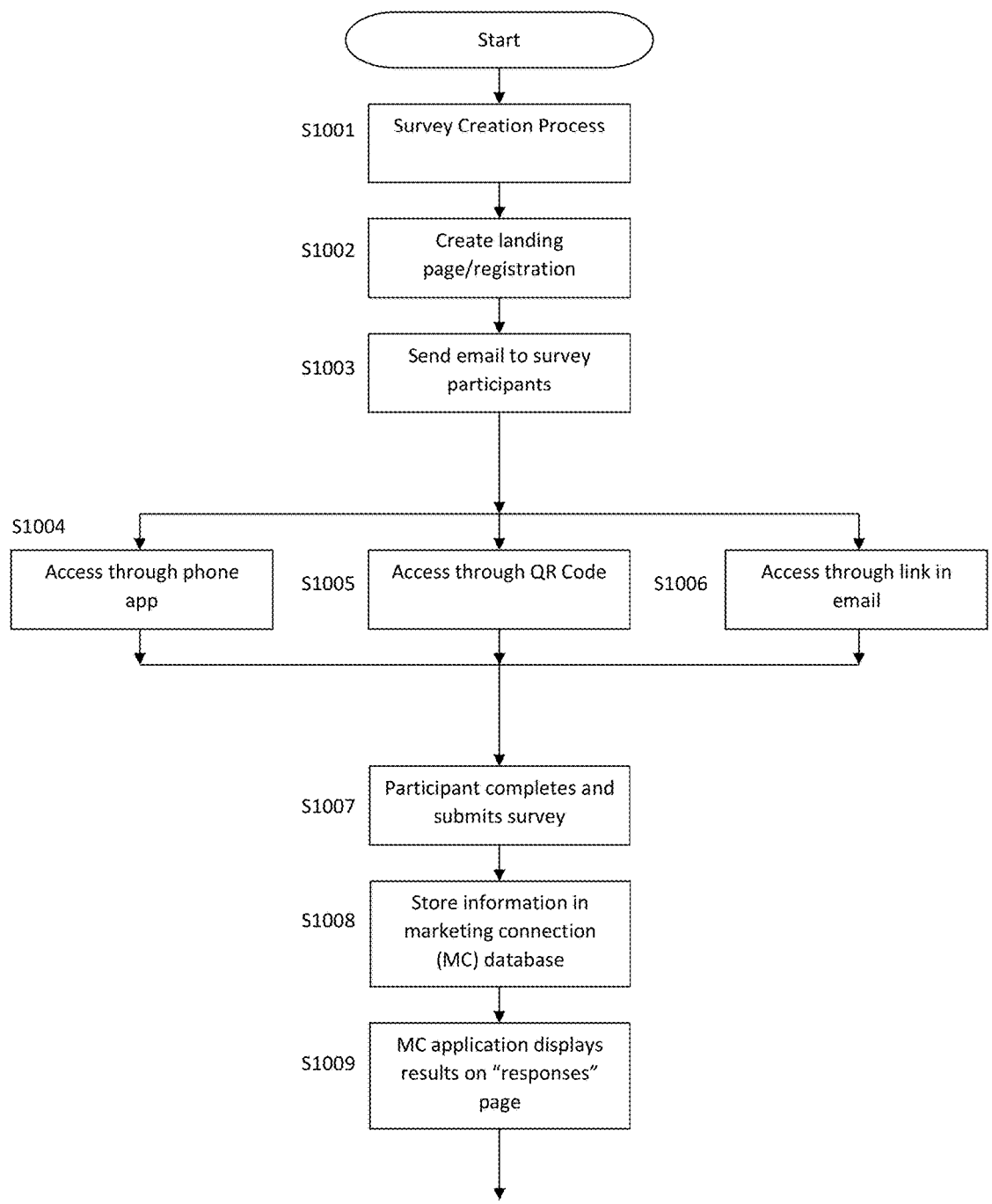
FIG. 10 shows a flow chart of a survey workflow, according to another exemplary embodiment

FIG. 10 show a process performed by a marketing application (e.g., 101a), for creating a survey that may or may not be associated with an event distributing the survey and obtain an analysis of the responses to the survey, according to an exemplary embodiment.

After starting a marketing application, a user creates a survey (step S1001). Next, a landing page corresponding to the survey is created (step S1002). Then, an email to notify that the survey is generated is sent to each potential participant (step S1003). When the potential participants of the survey open the email, he or she may be asked to complete the survey and may be provided multiple means of accessing it. In one method, the potential participant may access the survey via an application on their phone (step S1004). The application may display the survey to the potential participant by accessing the landing page. In another method, the potential participant may access the survey by a barcode (e.g., QR code) that on the email (step S1005). The potential participant may capture the barcode through a camera on his or her electronic device which causes the landing page containing the survey to be displayed to the potential participant. In yet another method, the potential participant may be provided a link in the form of a URL which corresponds to the landing page (step S1006). When the potential participant clicks on the link, a browser on his or her device may access the landing page containing the survey and display it to the potential participant. After the potential participant has access to the survey, he or she may complete and submit it (step S1007). Next, after the marketing application receives the submitted survey, the survey is stored (step S1009). Afterwards, an analysis on the surveys from multiple participants is generated and the results displayed (step S1009).

Figure 11A:
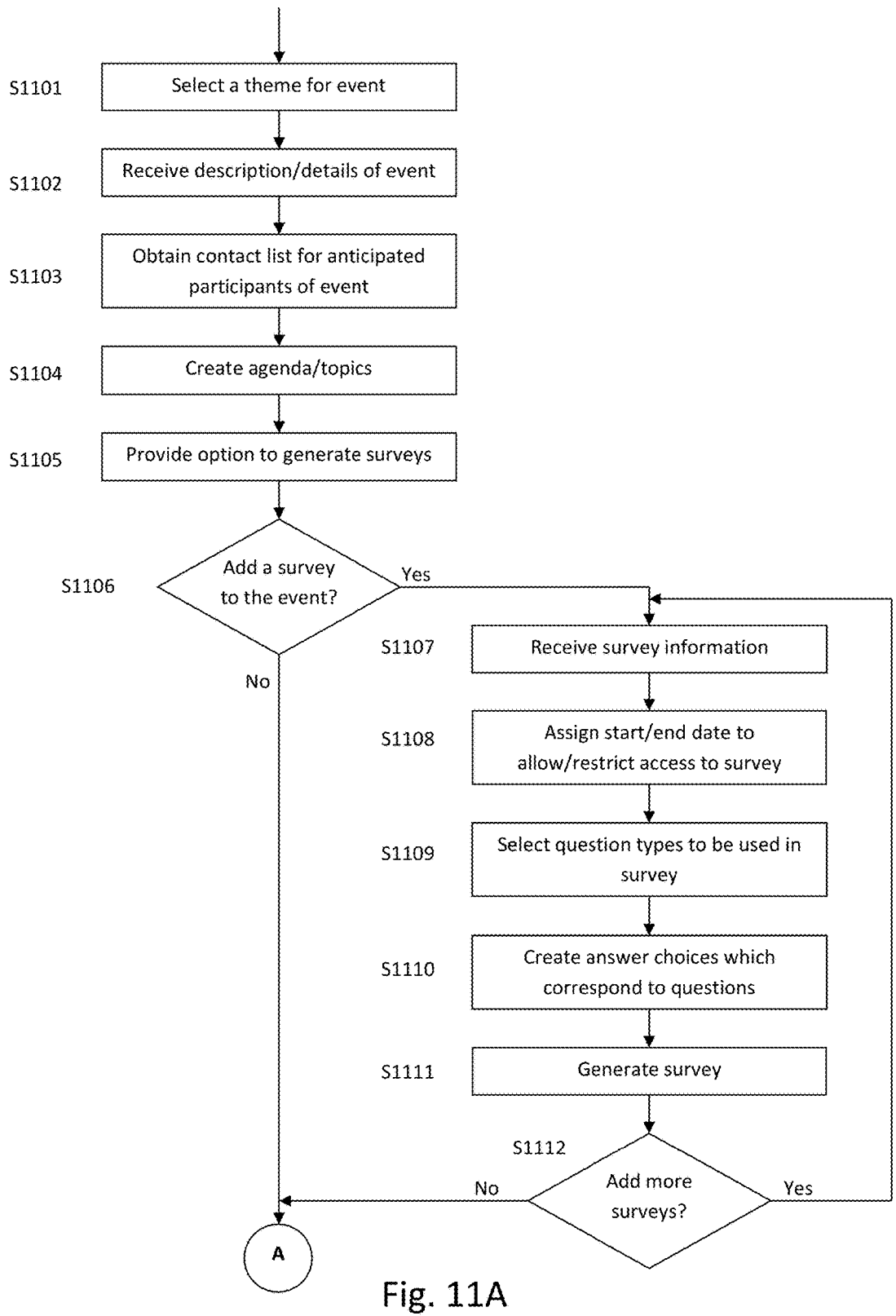
FIGS. 11A and 11B show a flow diagram of an event workflow in which the user can create one or more surveys for an event to be added, according to another exemplary embodiment
Figure 11B:
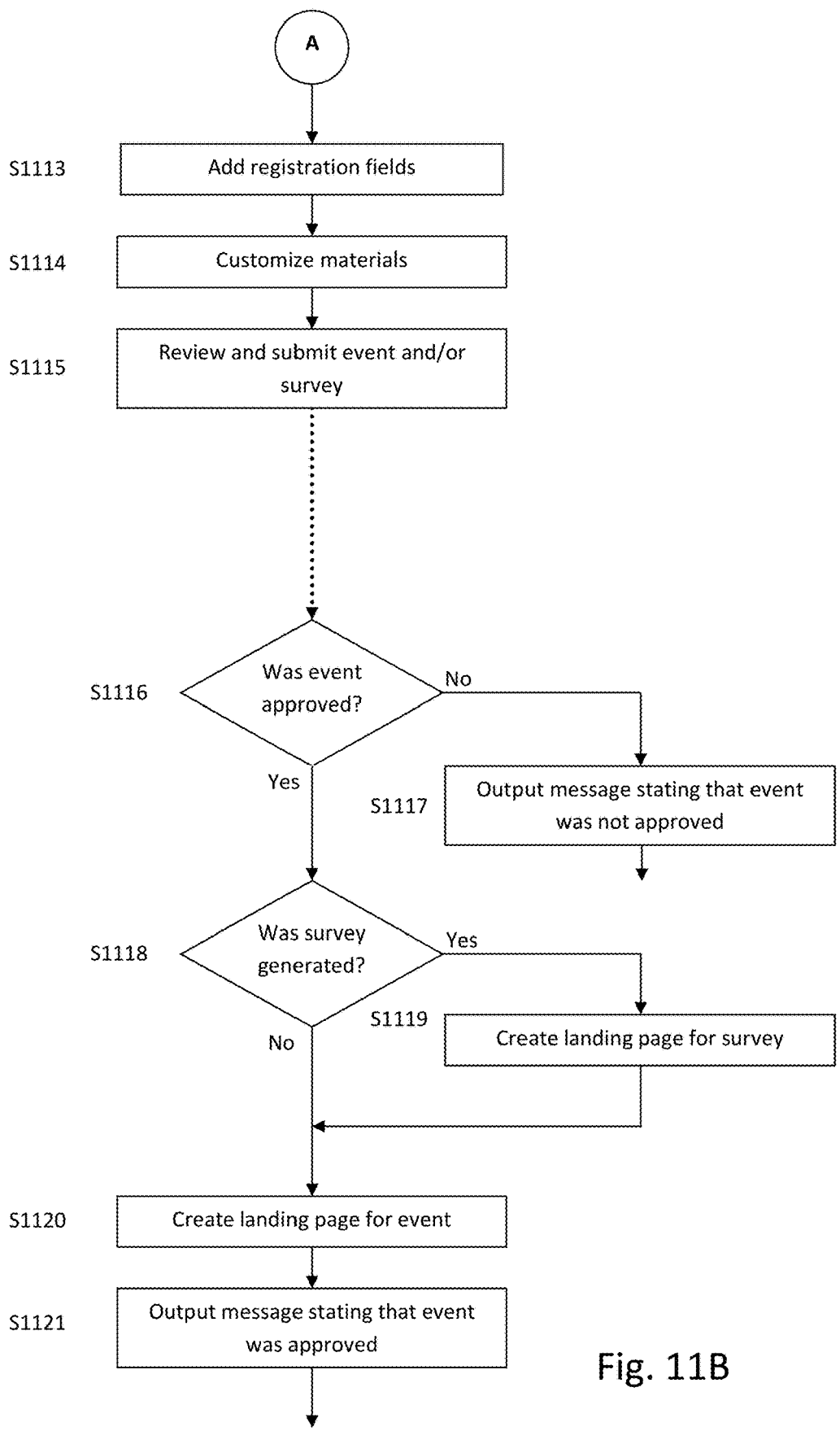

FIGS. 11A and 11B show an event process or workflow performed by a marketing application (e.g., 101a), according to an exemplary embodiment.

Figure 12A:
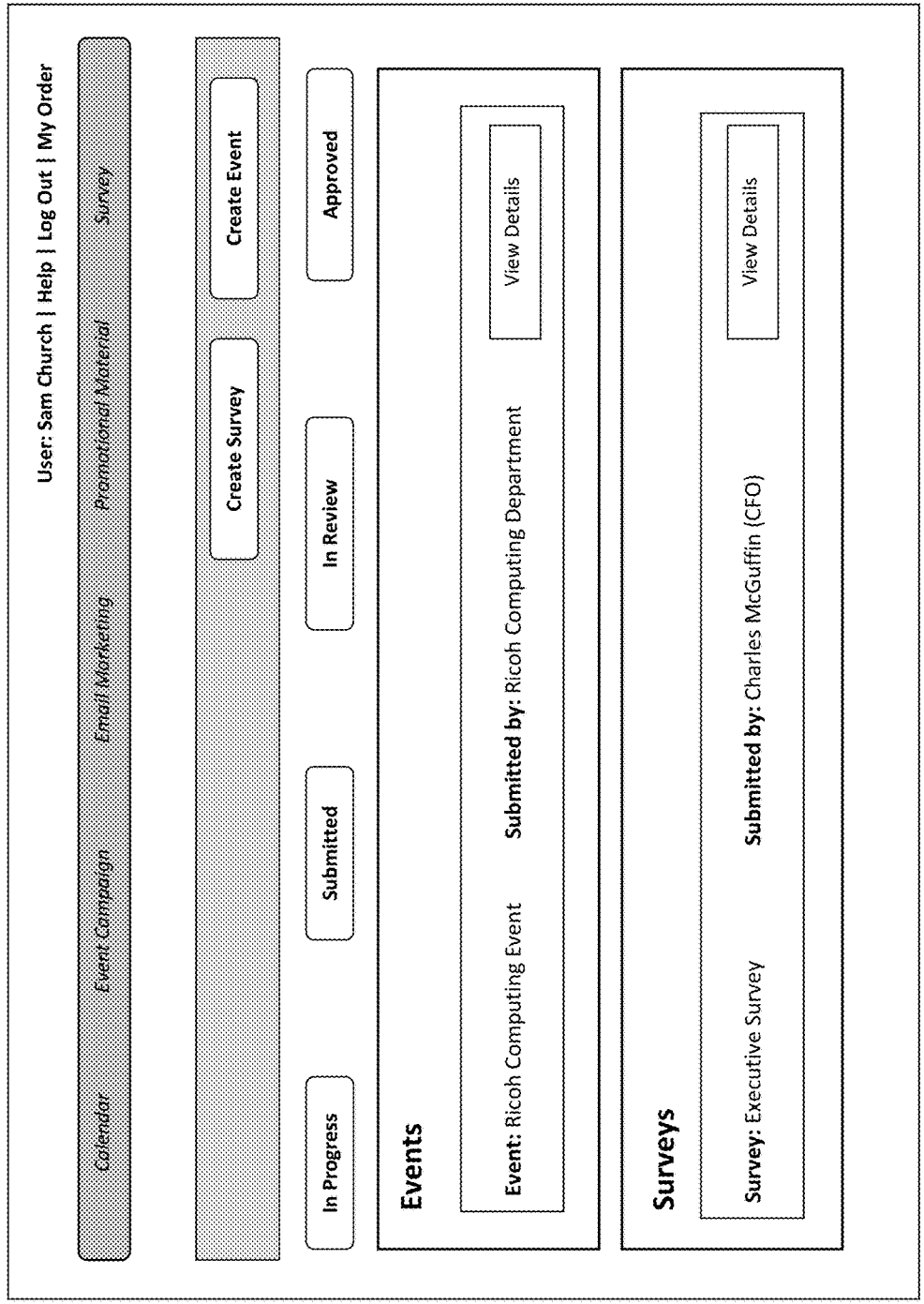

When a user wants to create one or more events or one or more surveys, the marketing application provides a user interface to the user as shown in FIG. 12A. In the case that the user wishes to create an event, he or she may do so by activating a "create event" button. On other hand, in the case that the user wishes to create a survey, he or she may activate a "create survey" button, instead.

Below, the "create event" and "create survey" buttons are an "In Progress" button, a "Submitted" button, a "In Review" button and an "Approved" button. The "In Progress" button allows the user to view all events and/or surveys that he or she is currently working on (but is not finished with yet). The "Submitted" button may show the user all events and/or surveys that he or she has finished and submitted for approval. It should be noted in a case that the user is not permitted to make his or her events and/or surveys official (e.g., public) until a supervisor or manager of the user authorizes it, the result of activating the "Submitted" button may display all submitted events and/or surveys made by the user (regardless of approval or not). The "In Review" button may show all events and/or surveys that have been submitted by the user that is pending approval by his or her supervisor. The "Approved" button may allow the user to view all events and/or surveys that have been approved by his or her supervisor.

Further, below the aforementioned buttons (e.g., "In Progress", "Submitted", "In Review", "Approved"), is a list of one or more events and/or surveys which have been submitted (and was approved) by other users. For example, a user "Sam Church" may be part of a marketing events team that is comprised of a plurality of team members. Each team member may be working on a different survey and/or event. Consequently, whenever one member has his or her event and/or survey approved, everyone on the team (including "Sam Church") may see it and view its details (by pressing "a View Details" button) via this list. This allows each team member to coordinate his or her actions with regard to creating events and/or surveys and may further enhance idea exchanges.

Figure 12B:
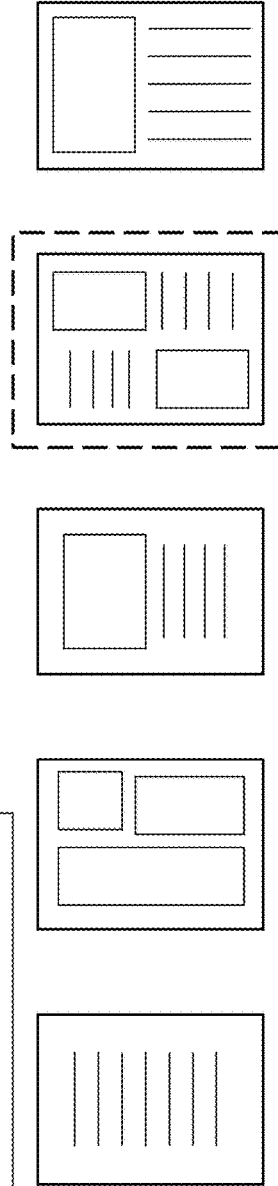

FIG. 12B shows an example of an interface provided by the marketing application that is displayed to the user when he or she activates the "Create Event" button from the screen shown in FIG. 12A. In this case, marketing application receives from the user (e.g. Sam Church) his or her name and corresponding email address. Further, the marketing application also receives a selection of a theme for the event (step S1101). As illustrated in FIG. 12B, many different types of templates corresponding to a theme may be provided to select from. By pressing a "previous" or "next" button, the user may cycle through the different themes offered by the application. In addition, the user may save his or her progress by activating the "Save Progress" button.

Figure 12C:
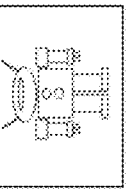

When the user activates a "Next (step 2)" button, the marketing application receives from the user details of the marketing event (e.g. event name, requester name, requester email, event description, start date, end date, date and time of the event, location name, phone number, address, etc.), as shown in FIG. 12C (step 1102). In addition, the user may upload a picture containing a logo for the event by pressing an "Upload Picture" button. Further, in a "Date and Timings" section, the user may set how long the event is to last for each day. For example, in the case that the event lasts only for one day, the user may input "Day 1: 8:00 AM-3:00 PM". On the other hand, in this case, the event lasts for four days (i.e. Aug. 8, 2014-Aug. 11, 2014). As a result, the user has input "Day 1 (Aug. 8, 2014): 9:15 AM-6:30 PM" for Aug. 8, 2014. The user may then add further days [e.g., Day 2 (Aug. 9, 2014), Day 3 (Aug. 10, 2014) and Day 4 (Aug. 11, 2014)] and their corresponding timings via the "Add" button.

Figure 12D:
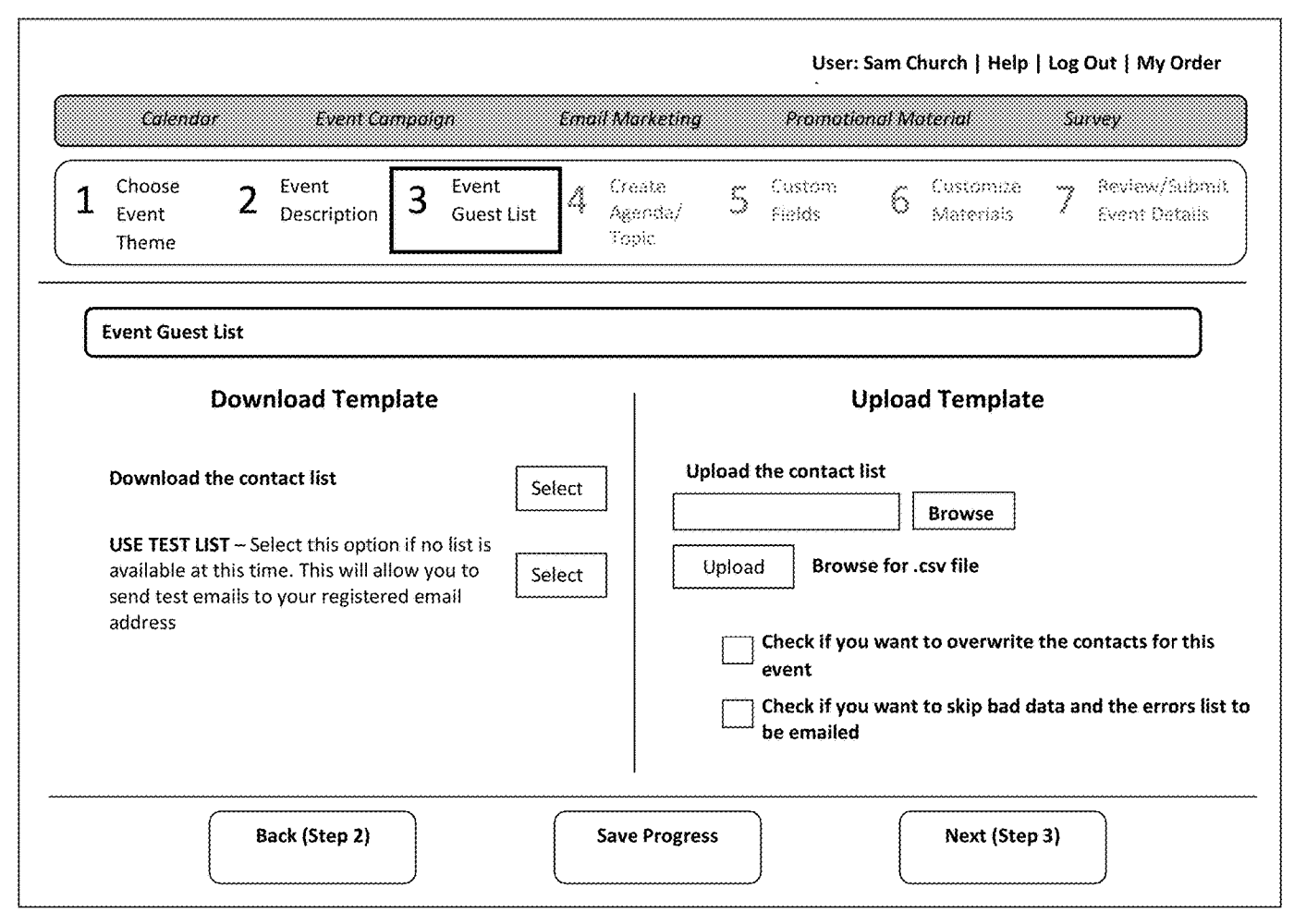

When the user activates the "Next (step 3)" button, the marketing application obtains from the user the participants (e.g., guests) for the event (step S1103), as shown in FIG. 12D. The user may download the existing contact list (including contact information of the guests invited to the event), download a test list if no such contact list exists, or upload a contact list which includes the addresses (e.g. email address or mailing address) of the guests to be invited to the marketing event.

Figure 12E-1:
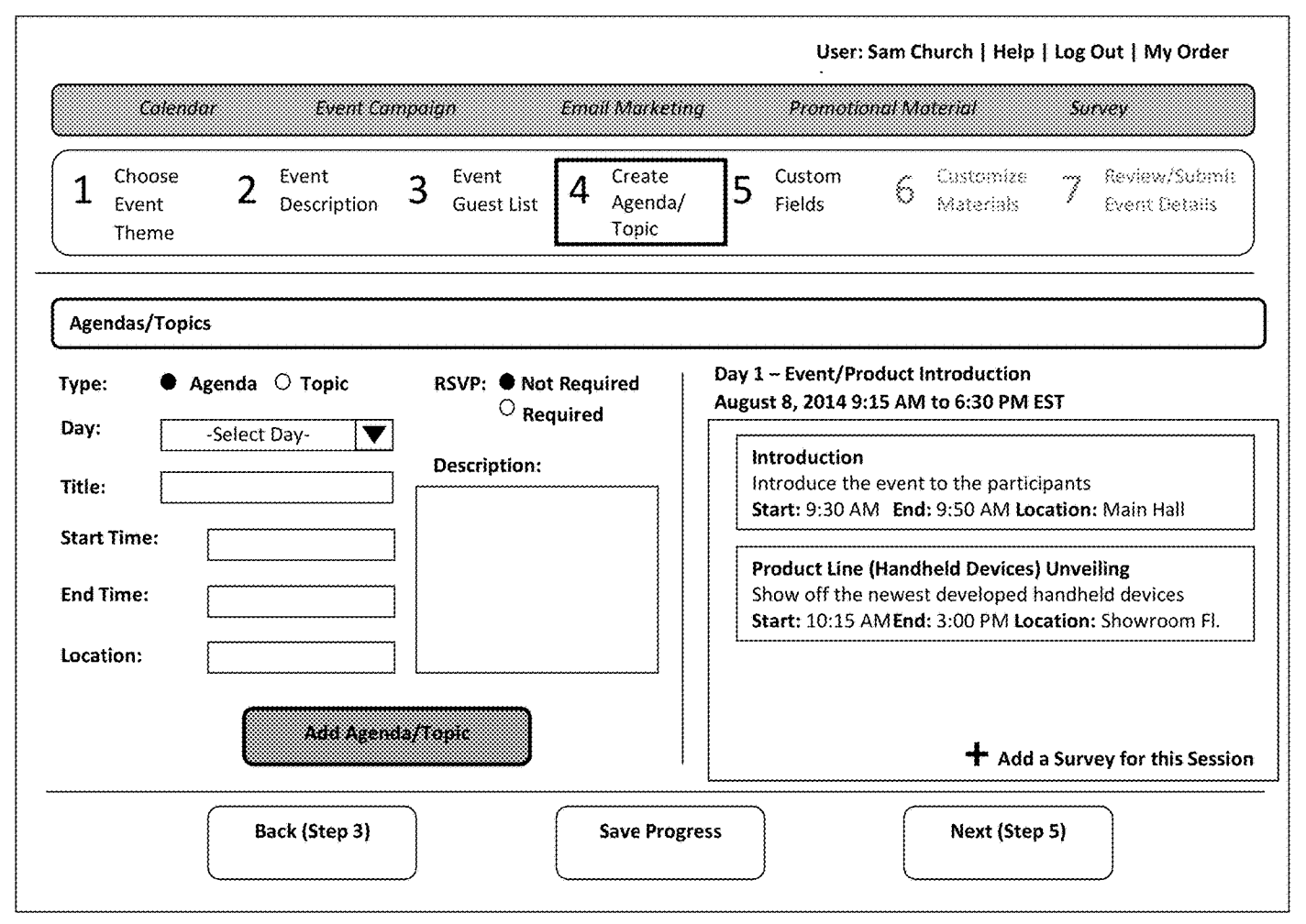
Figure 12E-2:
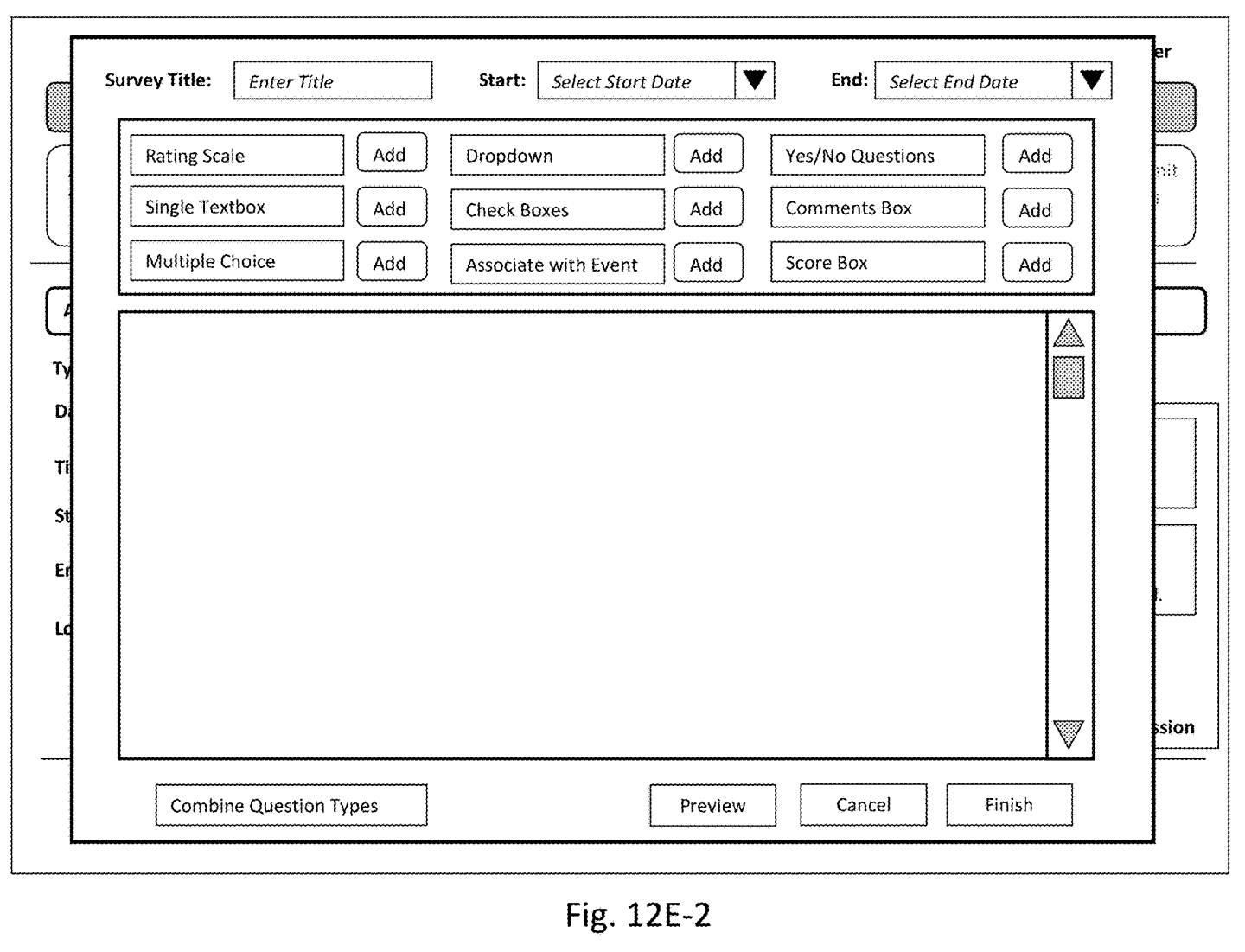
Figure 12E-3:
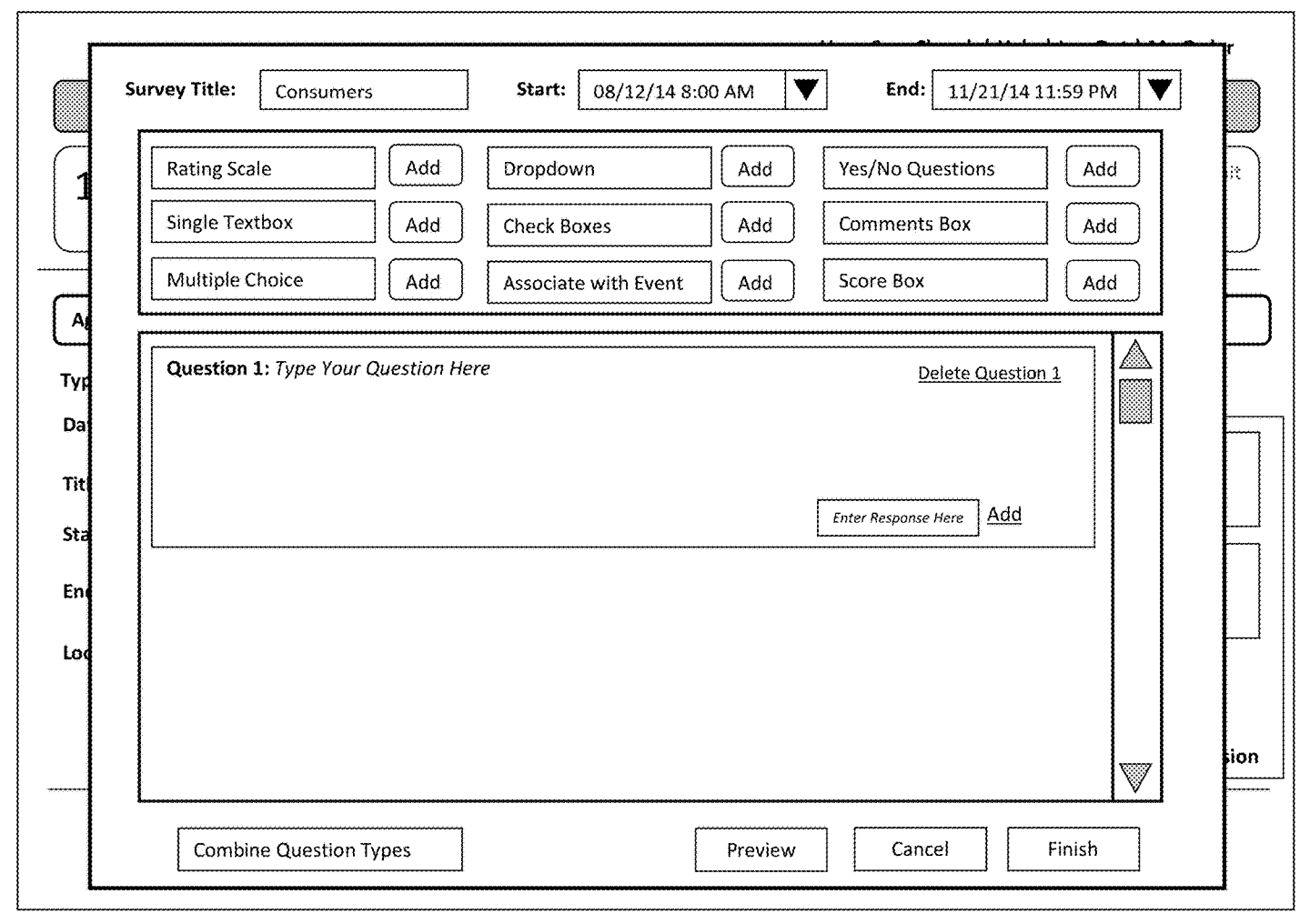
Figure 12E-4:
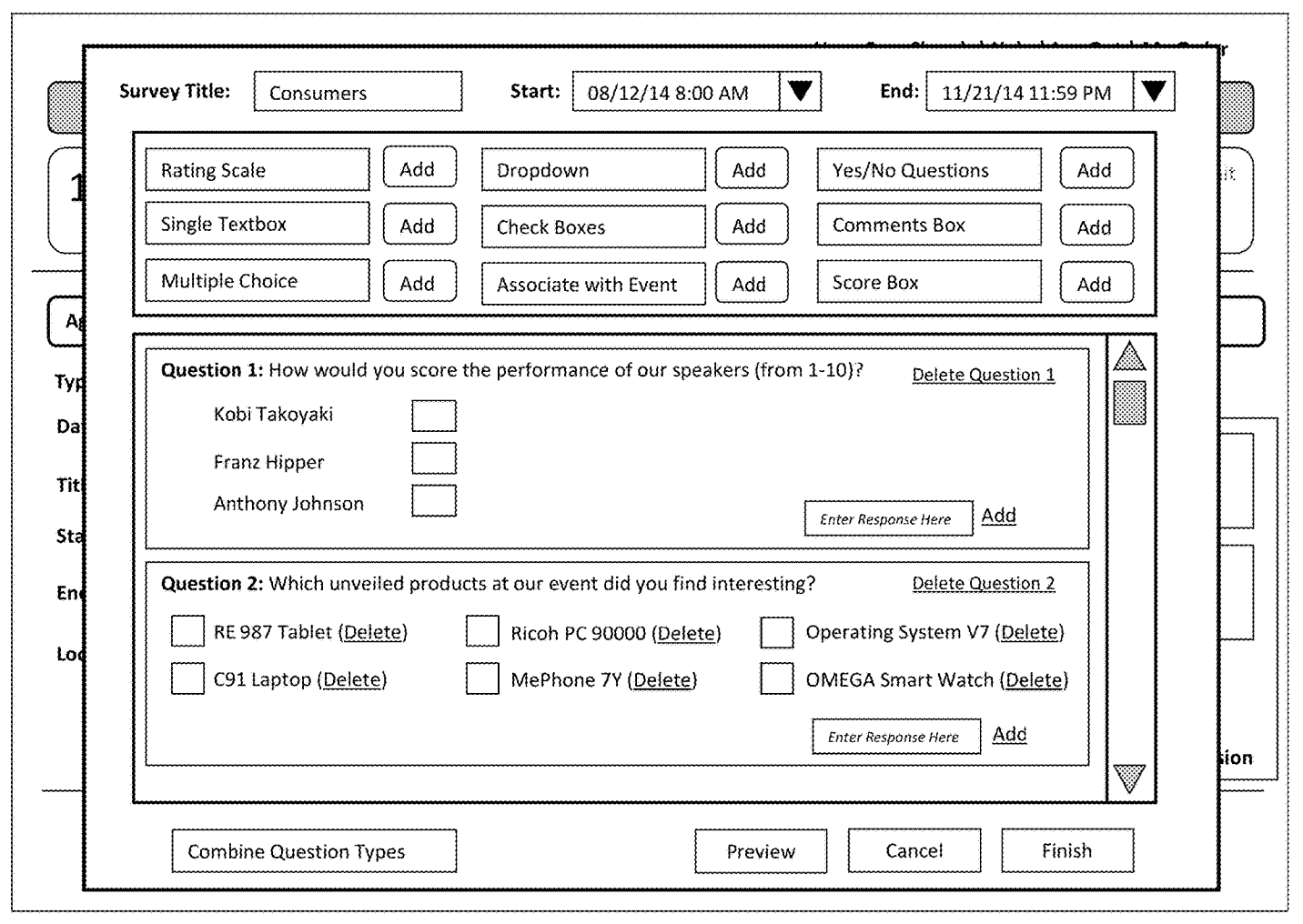
Figure 12E-5:
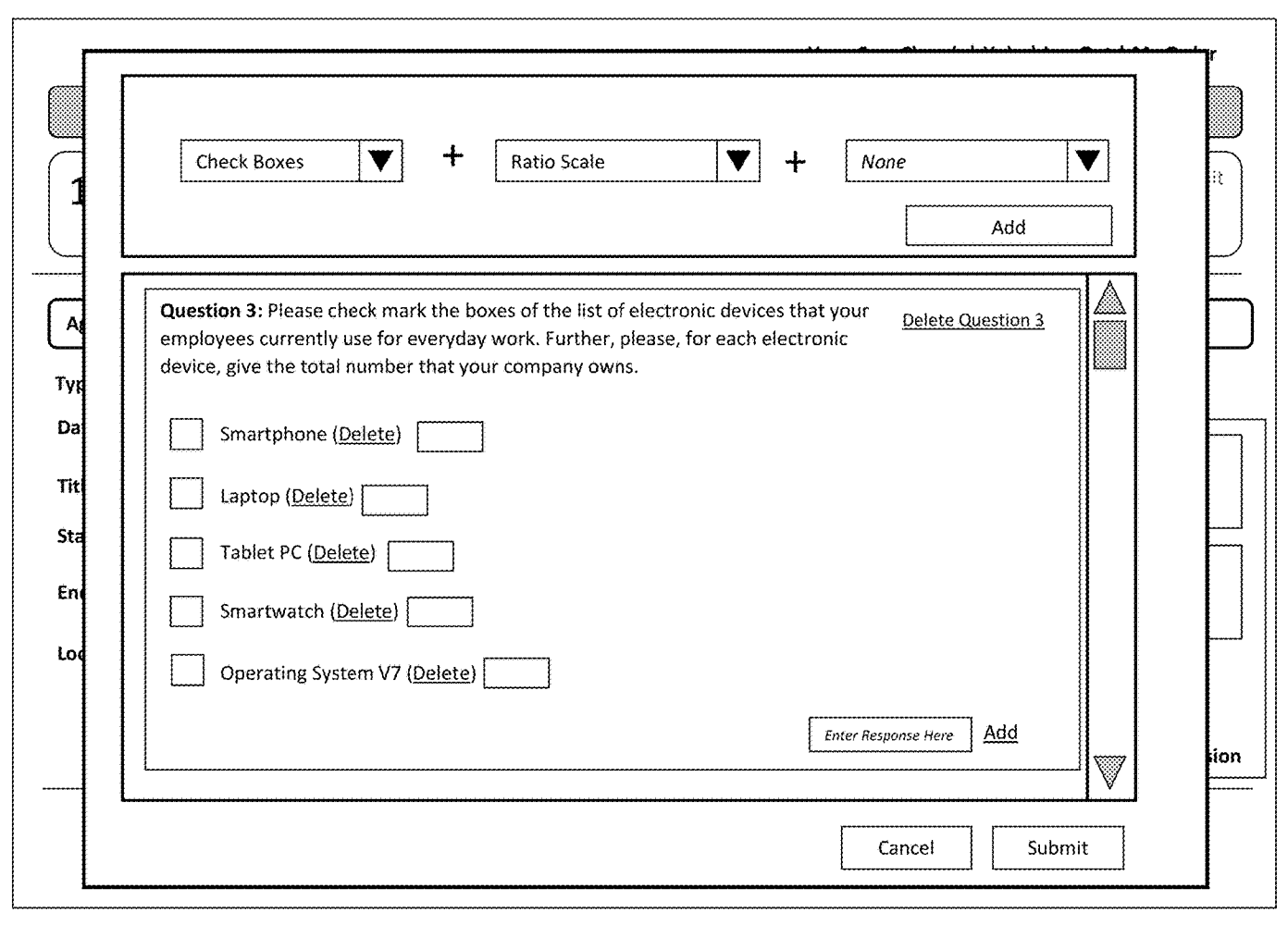

When the user activates the "Next (step 4)" button, the user is shown a screen that allows the user to create an event agenda and/or topic for each day of the event as shown in FIG. 12E-1. The agenda may be one or more sub-events that may take place simultaneously or in a series with respect to each other within the main event (e.g., guest speakers, product unveiling, raffle, contests, etc.). To create an agenda and/or topic, the user first selects the corresponding radio button. Next, in a case that the main event spans two or more days, the user may select the day that he or she wants to create the event and input its corresponding title, starting time, ending time, location, description and RSVP requirements (i.e. required or not required). After the user has input the information, he or she may add it to the event by activating the "Add Agenda/Topic" button. This causes the marketing application to generate an agenda or topic which is then shown in the right portion of the screen (step S1104). Further, the marketing application provides the user to option to add a survey corresponding to one or more agenda/topic and/or day (step S1105).

In a case that the marketing application receives an instruction from the user to generate a survey (step S1106, yes), a screen is provided to the user to allow him or her to create a survey as shown in FIG. 12E-2. As shown in FIG. 12E-2, the survey is currently blank (e.g., there is no survey title, start date, end date, questions, responses, etc.).

Thus, as shown by FIG. 12E-3, the user inputs basic information such as a description and/or a name for the survey (step S1108). Next, the user may select a start date and an end date for the survey (step S1109). The start date may indicate when the participants of the survey are able to access (i.e. participate in) the survey. Although the example in FIG. 12E-3 shows that the survey starts on the day after the event ends (e.g., Aug. 12, 2014), this may not always be the case. The user may designate, for whatever reason, that the survey be accessible anytime (e.g., before, during and after event). The end date may be the date that the participants of the survey have restricted access to the survey. In other words, once the end date passes, the participants may either have no longer access to the survey or may have only some access to certain portions of the survey. In an exemplary embodiment, after the end date, may have unrestricted access to the survey and may submit it. However, the submitted survey may not be utilized by the receivers (e.g., creators of the event). In another exemplary embodiment, there may be different start and end dates for different groups of participants. For example, one group (e.g., participants who are identified as executives) may have immediate access to the survey during the event. On the other hand, another group (e.g. participants who identified as consumers) may have access to the survey after the event ends.

Next, the user may create a questions to the survey by activating one of the plurality of "Add" buttons which correspond to a question type (e.g. "Rating Scale", "Single Textbox", "Drop Down", "Check Box", etc.). As shown in FIG. 12E-3, after the user has selected a question type by activating the "Add" button, the marketing application generates the question type (step S1109) and also creates an interface in which users can input answer choices that correspond to that question type (S1110). For example, in the example shown in FIG. 12E-4, the user has selected for "Question 1" a score box for the question type. As a result, the marketing application creates a score box for each of the responses. On the other hand in "Question 2", the question type relates to selecting one or more multiple choices (i.e. check boxes). As a result, the marketing application generates a series of two or more check boxes for the question. The user may add/delete questions/response from the survey via the "add" or "delete" buttons. After the user is finished with creating the survey, he or she may press the "Finish" button to have the marketing application generate the survey (step S1111).

Further, the marketing application provides the user with the option to combine question types. To facilitate this, the user activates the "Combine Question Types" button which brings up a screen as shown in FIG. 12E-5. Here the user may select to combine two or more question types. In the example shown in FIG. 12E-5, the user has selected to combine "Check Boxes" and "Ratio Scale" into a single question type. However, although there exists an option to combine three question types, the user, in this case, only wants to combine two question types and, therefore, he or she inputs a "None" option for the third question type option. Next, the user may preview the resulting combined question by pressing the "Add" button which causes the marketing application to generate the question below the option to combine question types. As shown, since the user has selected "Check Boxes" for the first question type, the response are in a format corresponding to that question type. However, since the user had also selected "Ratio Scale" for the second question type, each response (e.g., "Smartphone", "Laptop", "Tablet PC", etc.) to the question also includes a box for inputting a number. Like previously, the user may add/delete questions/response from the survey via the "add" or "delete" buttons. After the user is finish creating the questions, he or she may activate the "Submit" button to add the one or more combined questions to the survey. On the other hand, the user may activate the "Cancel" button if he or she changes her mind and does not want any combined question in the survey.

In an exemplary embodiment, the order of the question types may affect how the marketing application generates the resulting combined questions. For example, in the case that the user selected "Multiple Choice" for the first question type and "Ratio Scale" as the second question type, the responses may be in multiple choice format with each having a corresponding box to input a number (i.e. the user only has one choice to select from and, after he or she selects that choice, the user inputs a number corresponding to that choice). On the other hand, in the case that the user selected "Ratio Scale" for the first question type and "Multiple Choice" for the second question type, each response has a corresponding selection of pre-selected numbers (e.g., the user is given four responses and he or she inputs a number for each response. However, the user has only two or more pre-selected numbers to select from).

Further, the user may preview the survey that he or she has created by activating the "Preview" button which causes a user to be presented with a screen as shown in FIG. 12E-6. Here the user may view how the survey is to be shown to the potential participants.

Figure 12F:
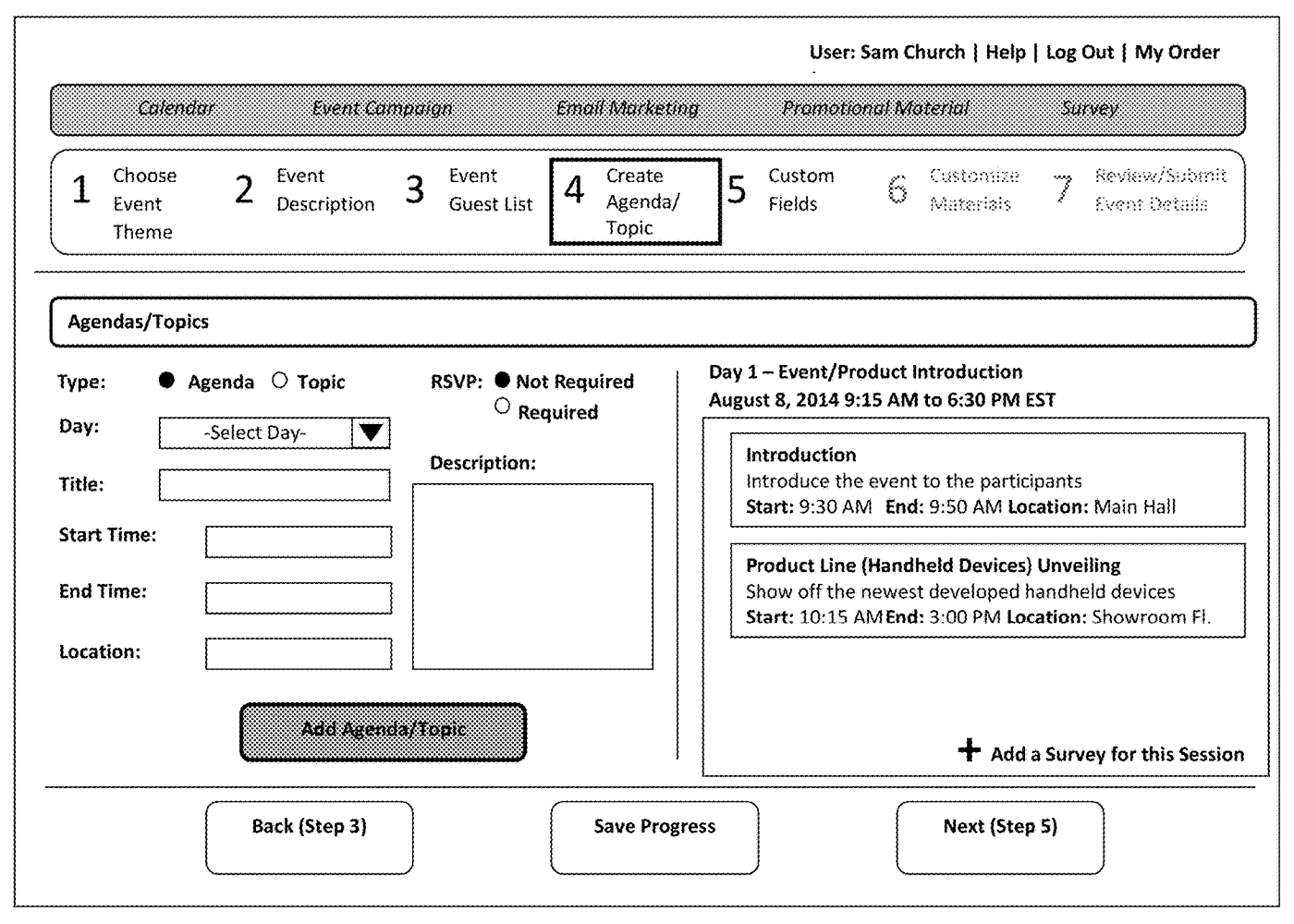
Figure 12G:
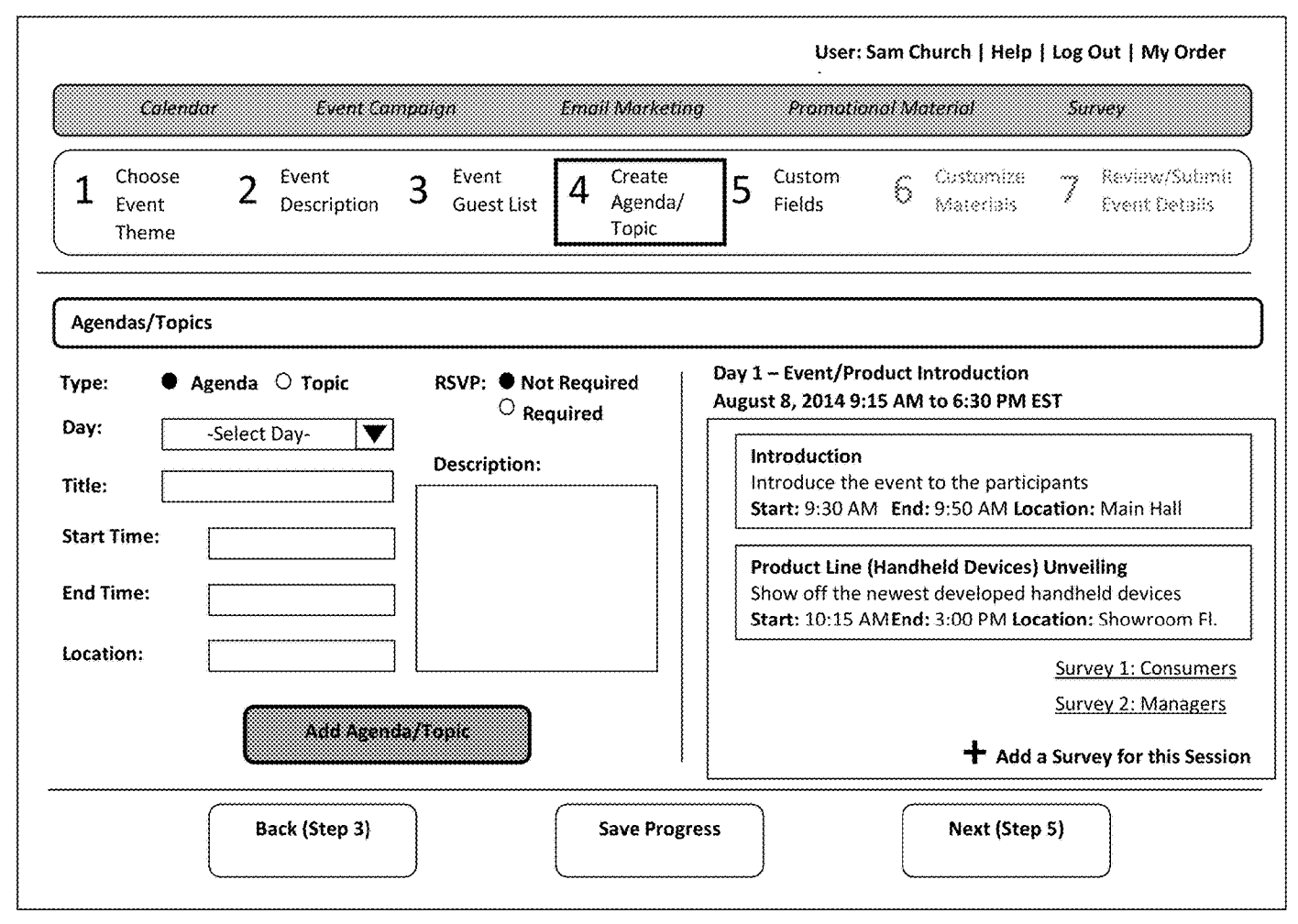

FIG. 12F depicts a screen after the user has added one or more agenda/topics. As stated previously, an agenda/topic may be associated with multiple surveys (FIG. 12G). Likewise, a day may be associated with one or more surveys as well. Further, if the marketing application receives an instruction from the user to add more surveys (step S1112, yes), the user is presented with the screen for adding questions again and the process is repeated. Otherwise, the user moves onto the next step (step S1112, no).

Figure 12H:
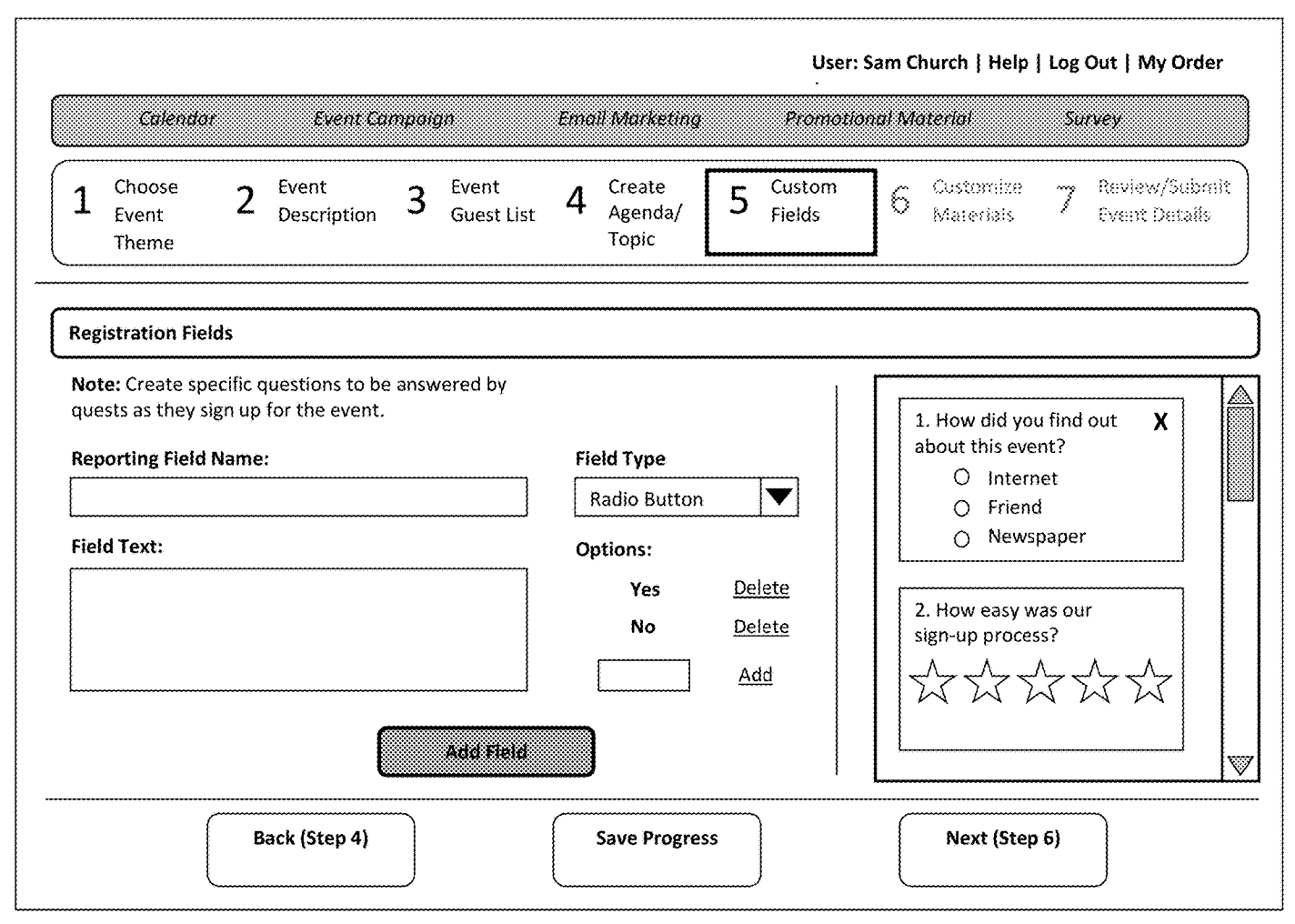

When the user activates the "Next (step 5) button", a registration customization screen is displayed to the user by the marketing application, as shown in FIG. 12H. The registration customization screen allows the user to customize information fields of a registration GUI to be provided at a registration page (e.g. a page via which the user registers for the marketing event). There may be a standard set of questions to be asked in the registration page by default. In an exemplary embodiment, the results of the questions may be utilized as additional data when the surveys are analyzed. After, the user has input the information needed for the registration fields the, the marketing application adds them to the event (step S1113). The user is shown the registration fields created by him or her on the right side of the screen.

When the user activates the "Next (Step 6) button, the user is shown a GUI for customizing materials as shown in FIG. 12I. The marketing application allows a user to select a marketing template and populate the selecting marketing template with event information maintained in the marketing object, for user selection of already-generated materials (step S1114). Further, the marketing application allows user modification of the populated marketing template and/or already-generated materials to form customized marketing materials for the selected marketing event and for causing the customized marketing materials to be maintained in association with the marketing object for the selected marketing event. To customize the materials, the user can choose the type of document the user wishes to customized (e.g. invitation, save-the-date, reminder, thank-you note, etc.), and further choose from a plurality of templates (e.g. using the drop-down menu) and preview the chosen template including the event-specific details specified by the user (e.g. by activating the "preview" button).

When the user activates the "Next (step 7)" button, the marketing application provides the option for the user to review the details of the event and submit it (step S1115) as shown in FIG. 12J. The marketing application allows user selection of one or more of the event-specific details, customized marketing materials and other associated event-specific information, for the marketing event, for editing (e.g. by clicking on "edit" corresponding to the section that the user wishes to edit).

Figure 12K:
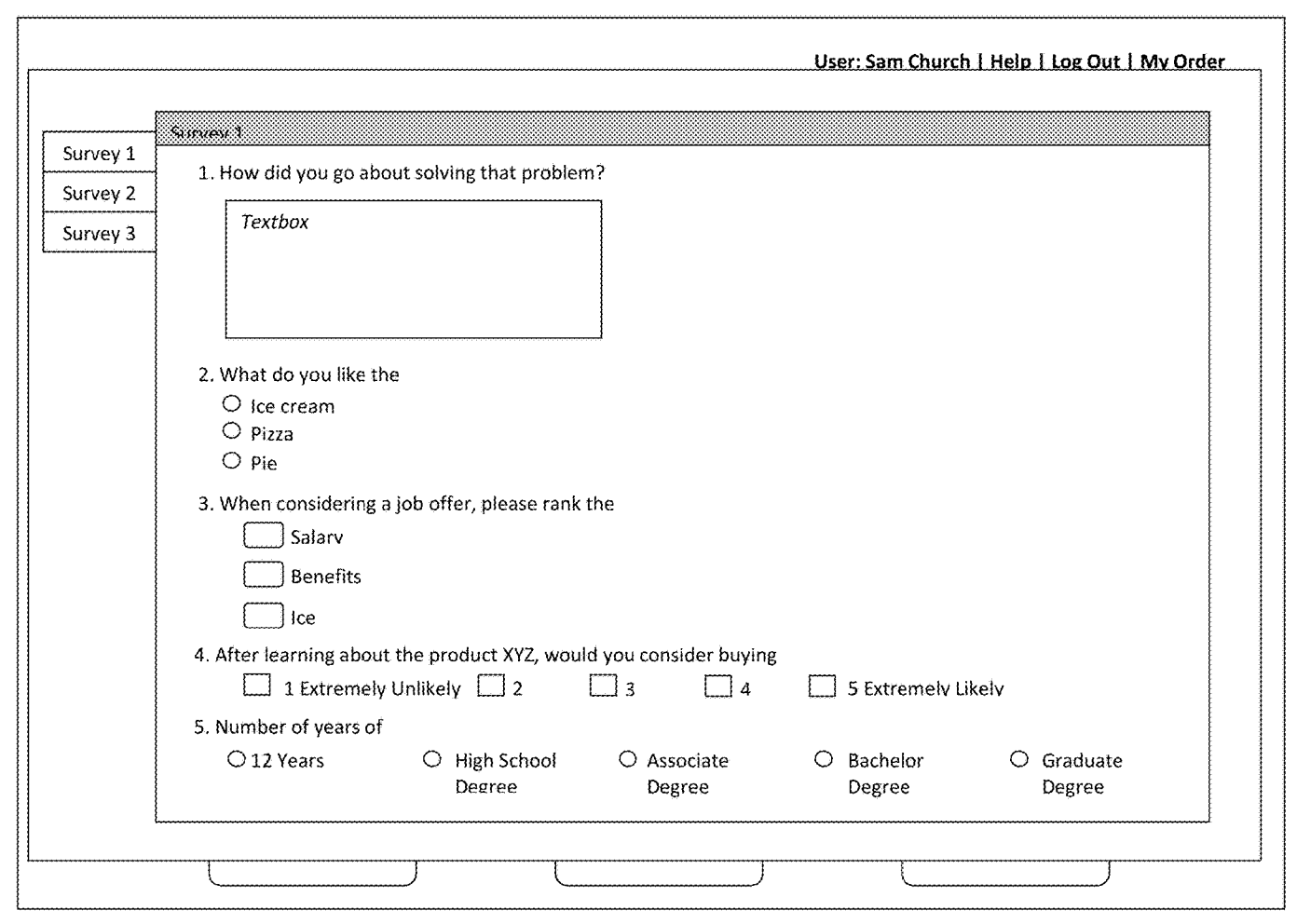

FIG. 12K shows an example of a screen that is presented to a user when he or she activates the "preview" button corresponding to a survey in FIG. 12J. In this embodiment, the user may view any survey that he or she has created via tabs to the left of the screen (e.g., "Survey 1", "Survey 2" and "Survey 3"). It should be noted that, in an exemplary embodiment, the surveys may correspond to different roles of the potential survey participants. As stated previously, the survey may contain many types of questions and question types. "Question 1" is an example of an open-ended question, meaning that survey respondents may type in any response that they wish. "Question 2" and "Question 5" are examples of multiple choice questions in which survey respondents may select one and only one answer choice. "Question 3" is an example of a ranking question, meaning that survey respondents may classify/arrange the answer choices in the order that they prefer. "Question 4" is an example of an ordinal scale question in which users select an answer among an ordered set.

Once the user activates the "submit" button, the marketing application indicates to the user that the marketing object, associated event-specific details, customized marketing materials and other associated event-specific information, for the marketing event, have been submitted for approval by an event administrator (step S1116), as shown in FIG. 12L.

After an indeterminate amount of time, the marketing application may notify the event administrator that the user has submitted an event for approval. In the case that the event is not approved by the event administrator (step S1116, no), the marketing application sends a message to the user indicating that his or her event was not approved (step S1117). On the other hand, in the case that the event was approved (step S1116, yes), the marketing application determines whether the user added one or more surveys to the event (step S1118). In the case that the event contains one or more surveys (step S1118, yes), the marketing application creates a landing page for the survey. Otherwise (step S1118, no), the marketing application skips the step of creating a landing page for the survey and proceeds to create a landing page for the event (step S1120). Afterwards, the marketing application outputs a message to the user indicating that the event was approved as well as the fact that the landing pages were created (step S1121).

Figure 13A:
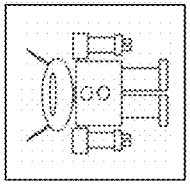
FIG. 13A shows an example of a landing page for an event created by the marketing application, according to an exemplary embodiment.

FIG. 13A shows an example of a landing page for an event that was created by the marketing application. As shown, the landing page is a webpage that is on a microsite. As stated previously, the microsite may be generated by the marketing application when multiple surveys are created and approved. The microsite may be owned or utilized by an organization that is creating the event.

Figure 13B:
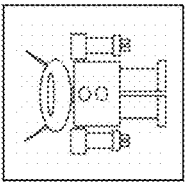
FIG. 13B shows an example of a landing page for surveys created by the marketing application for an event, according to an exemplary embodiment.

FIG. 13B shows an example of a landing page for a survey that was created by the marketing application. A participant of the event may encounter the landing page via an email which links him or her to the survey landing page. As shown, the survey page contains multiple links to multiple surveys. As a result, when the participant is asked to select a survey corresponding to his or her role (e.g., "Consumer", "Investor", "Executive", etc.), the participant has a plurality of surveys to select from. Further, should the participant identify with more than one role, he or she may complete multiple surveys. It should be noted that each survey (e.g., "Consumer", "Investor", "Executive", etc.) has a corresponding ending date next to it. This may mean that after that date, the survey can no longer be completed and/or submitted.

Figure 14:
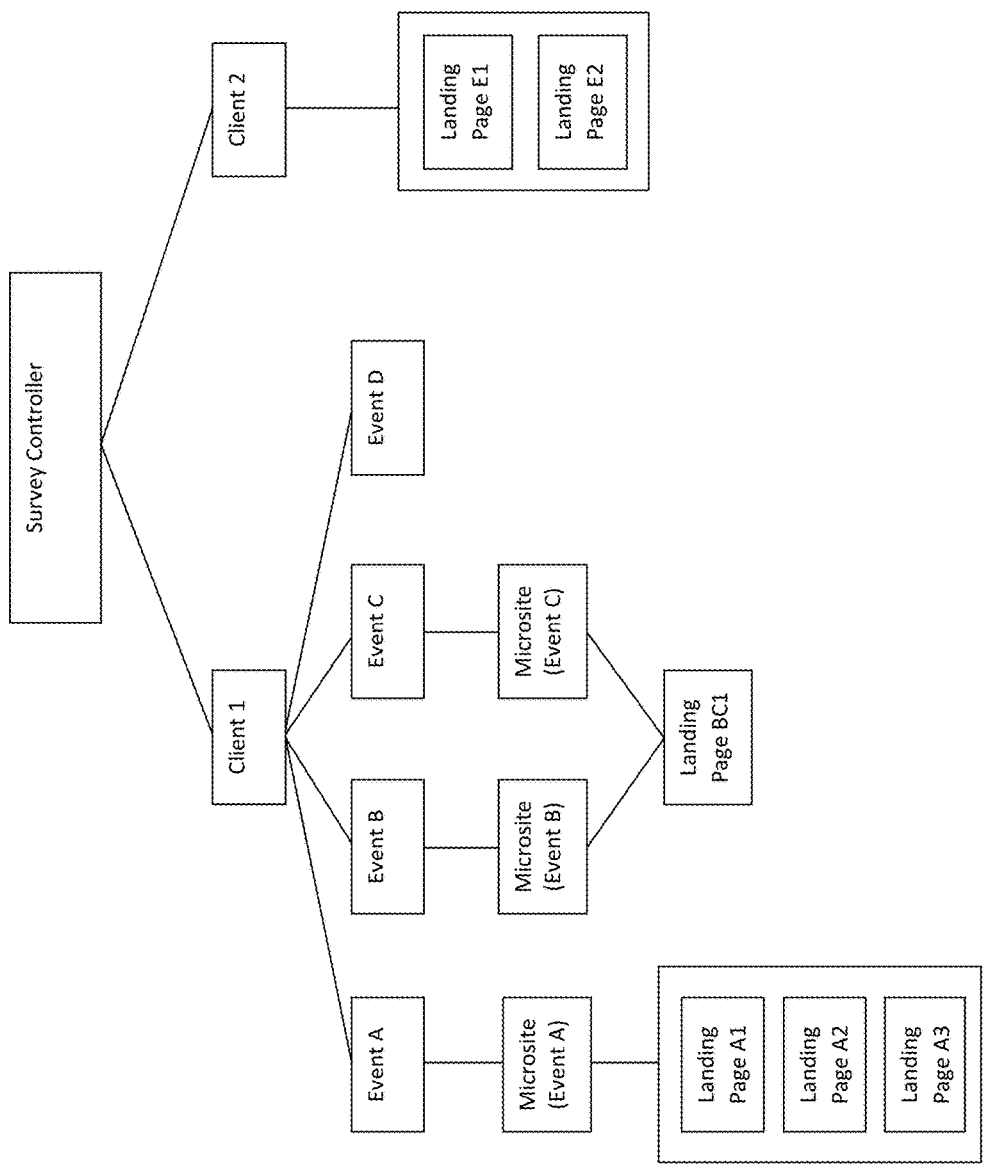
FIG. 14 shows a schematic view of a hierarchy of access control by the survey controller of FIG. 3.

FIG. 14 shows an example of a hierarchy of access control by a survey controller (e.g. "survey controller" in FIG. 3), to events, microsites and landing pages. As shown the survey controller may be used to manage several clients (e.g., "Client 1" and "Client 2") who may be individuals, companies or organizations. Further, each client may or may not have a marketing event associated with them.

In one embodiment, "Client 1" has decided to sponsor "Event A", "Event B", "Event C" and "Event D". Each of the aforementioned events may or may not occur simultaneously and may or may not be related to each other. In addition, "Client 1" wishes to have three surveys corresponding to "Event A". The three surveys may be created during the marketing event creation process. For each survey that is created, a landing page to include that survey is create as well (e.g., "Landing Page A1", "Landing Page A2", "Landing Page A3", etc.). In addition, since there is more than one survey, a microsite corresponding to the "Event A" is created to provide links to each of the aforementioned landing pages.

In another exemplary embodiment, the surveys may be created independently and associated later with the marketing event. This is the case for "Event B" and Event C". For example, "Event B" and "Event C" may be the same event (e.g., a film festival) located in different cities (e.g., New York and Boston). However, since "Client 1" also wishes to have a survey distributed for "Event B" and Event C", a single common survey may be used since the events are the same. As a result, a "Landing Page BC1" containing a survey is generated and associated with both "Event B" and Event C". Thus, it is possible for one survey or a group of surveys to be associated with multiple events.

In another exemplary embodiment, "Event D" has no surveys associated with it and thus no microsite site is created.

In another exemplary embodiment, a survey may be created without the need to be associated with any marketing event. For example, "Client 2" has not sponsored any sort of event and only possesses surveys (e.g., "Landing Page E1" and "Landing Page E2"). This may be the case in companies that only want to do a survey for existing products in order to gauge the market.

The steps for creating a new marketing event (e.g. as illustrated in FIGS. 11A-11B) and a corresponding survey are not limited to those discussed in the present disclosure, and one or more of the steps involved in creating the new marketing event and/or survey may be made optional, and one or more steps may be added in addition to the steps discussed herein.

Figure 15:
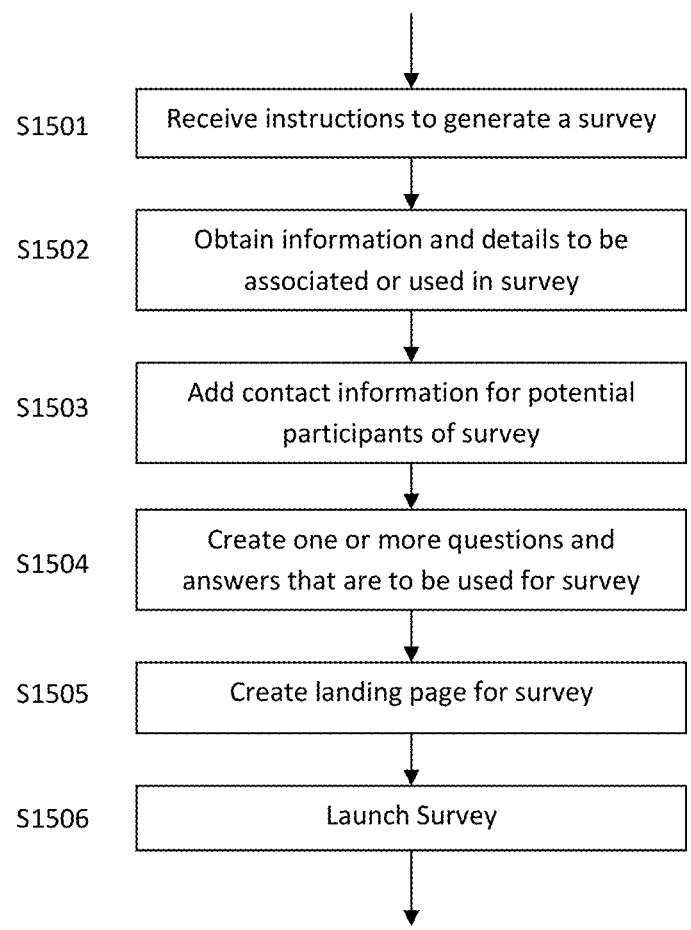
FIG. 15 show a flow diagram for a survey creation process of a marketing application, according to an exemplary embodiment

FIG. 15 show a process performed by a marketing application (e.g., 101a), for creating a marketing survey without any association to a marketing event, according to an exemplary embodiment.

Figure 16B:
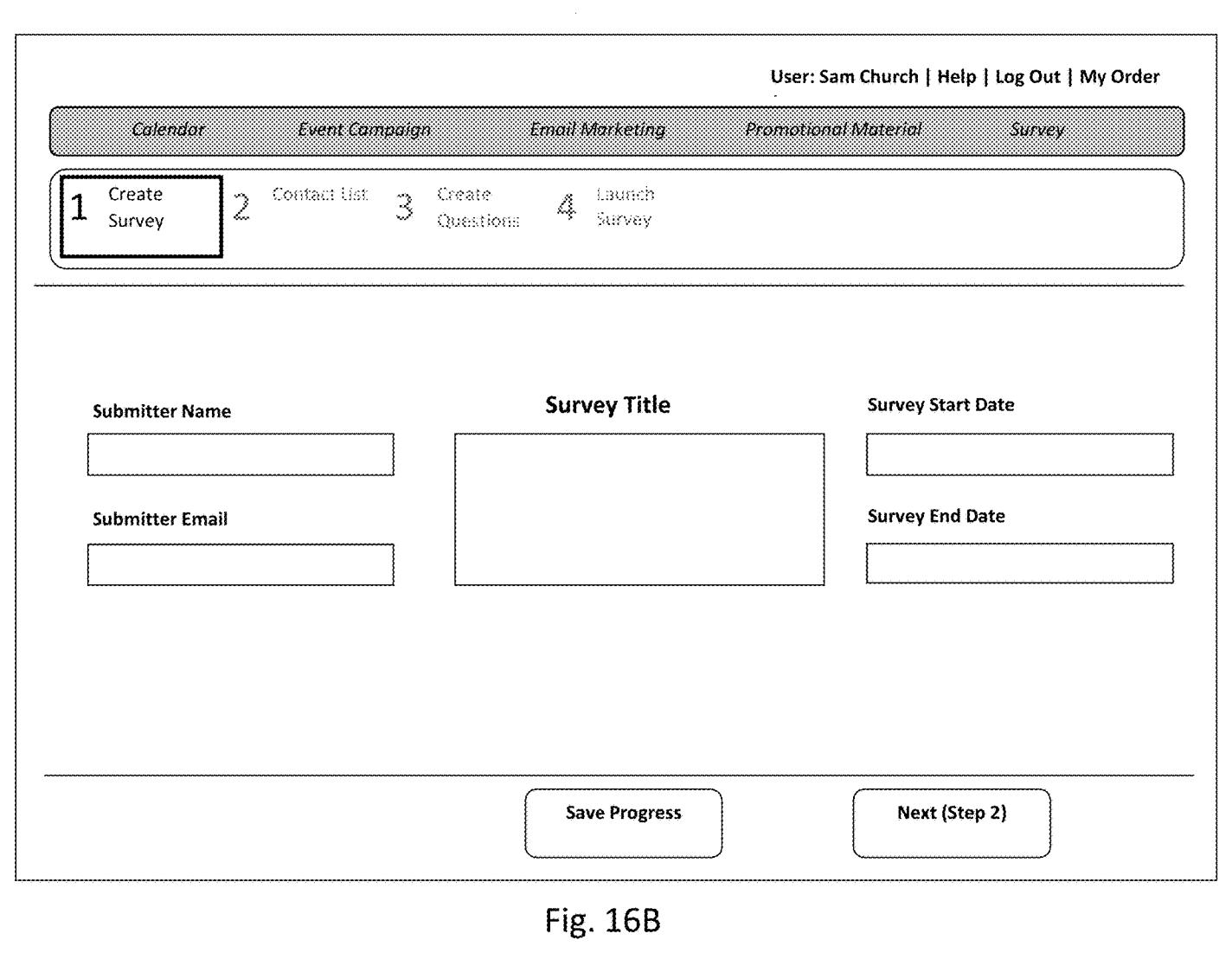

When a user wants to create one or more surveys without associating the surveys with any marketing event, he or she selects the "create survey" button on the interface (step S1501) shown in FIG. 16A. It should be noted that before the user creates a survey, he or she may view details on other surveys such as "Consumer Product" which is submitted by "John Doe" or "Robot Review" which is submitted by "Jane Knight" Next, the marketing application obtains information and details to be associated or used in the survey (e.g., "Submitter Name", "Submitter Email", Survey Title", "Survey Start Date", "Survey End Date" from the user (step S1502) by providing the user with the interface shown in FIG. 16B. Further, the user may utilize a "Save Progress" button to save his or her progress.

Figure 16C:
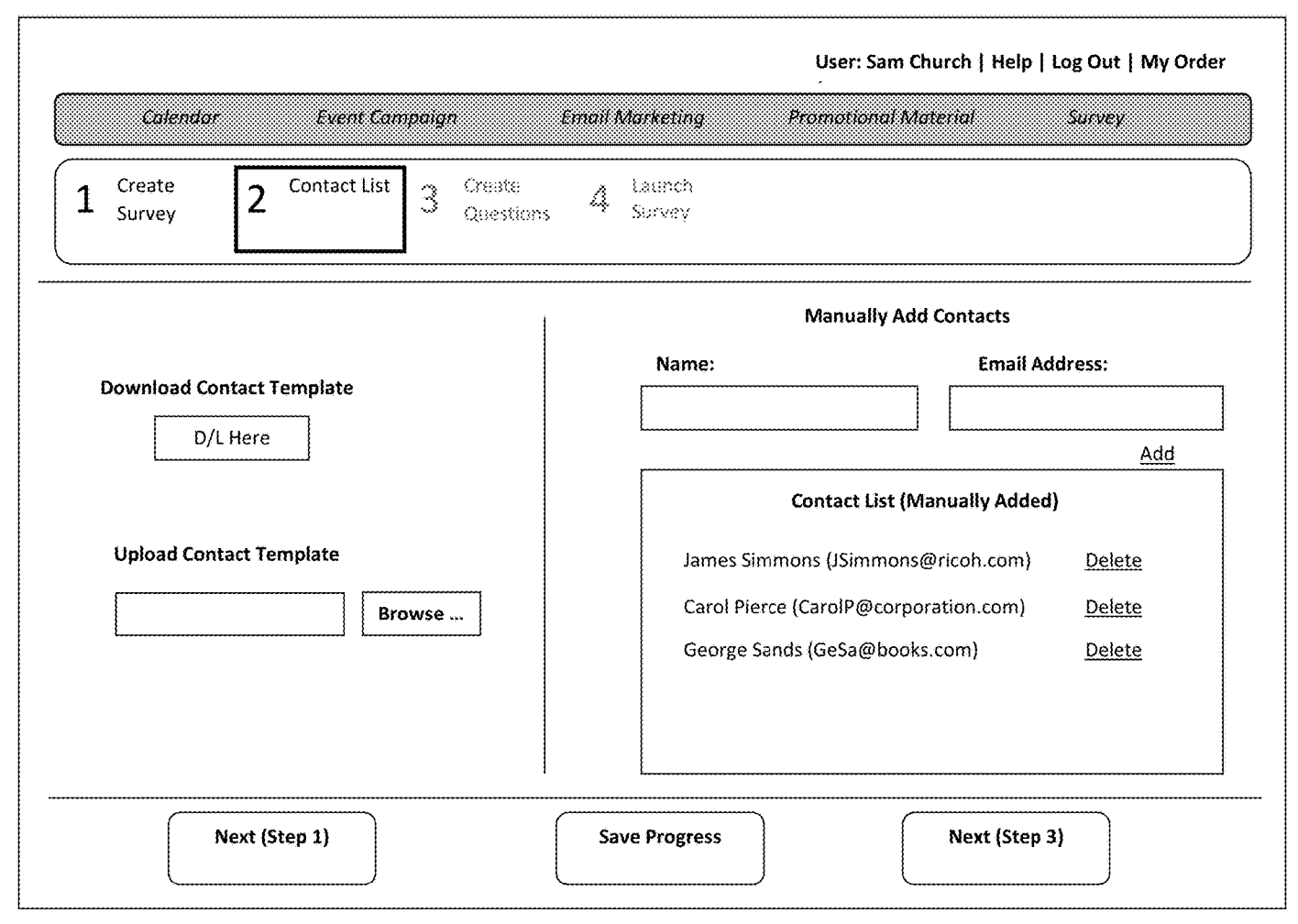

Next, after the user has activated the "Next (step 2)" button, contact information belonging to potential participants of the survey are added (step S1503) as shown in FIG. 16C. The user may upload a contact list via a template by activating the "Upload" button. However, in a case that the user does not have a template or does not know how to obtain one, he or she may download a template by activating the "D/L Here" button. In addition, should the user not want to user any templates, he or she may manually add the contacts instead. This is performed by inputting a name and corresponding email address in the appropriate fields and then activating the "Add" button. Once a name and corresponding email address is added, the information is provided in a list. The user may edit the list with the user of the "Add" and "Delete" buttons. It should be noted that the user is not limited to using only one form of adding contacts. In other words, the user may add contacts via the template, but simultaneously manually add contacts as well. This situation may happen in the case that the user receives a template containing a list of participants that is not editable for confidential reasons. As a result, in the case that the user needs to add more participants for the survey, he or she may manually do it instead.

Then, after the user has activated the "Next (step 3)" button, questions and their corresponding answers may be created for use in the survey (step S1504) as shown in FIG. 16D. The marketing application may provide the user with a plurality of question types (e.g., "Rating Scale", "Single Textbox", "Multiple Choice", etc.). By activating a corresponding "Add" button, the user may select one of the question types which are then added to a list. The user may add or delete questions and their answers via "Add" and "Delete" buttons.

Figure 16E:
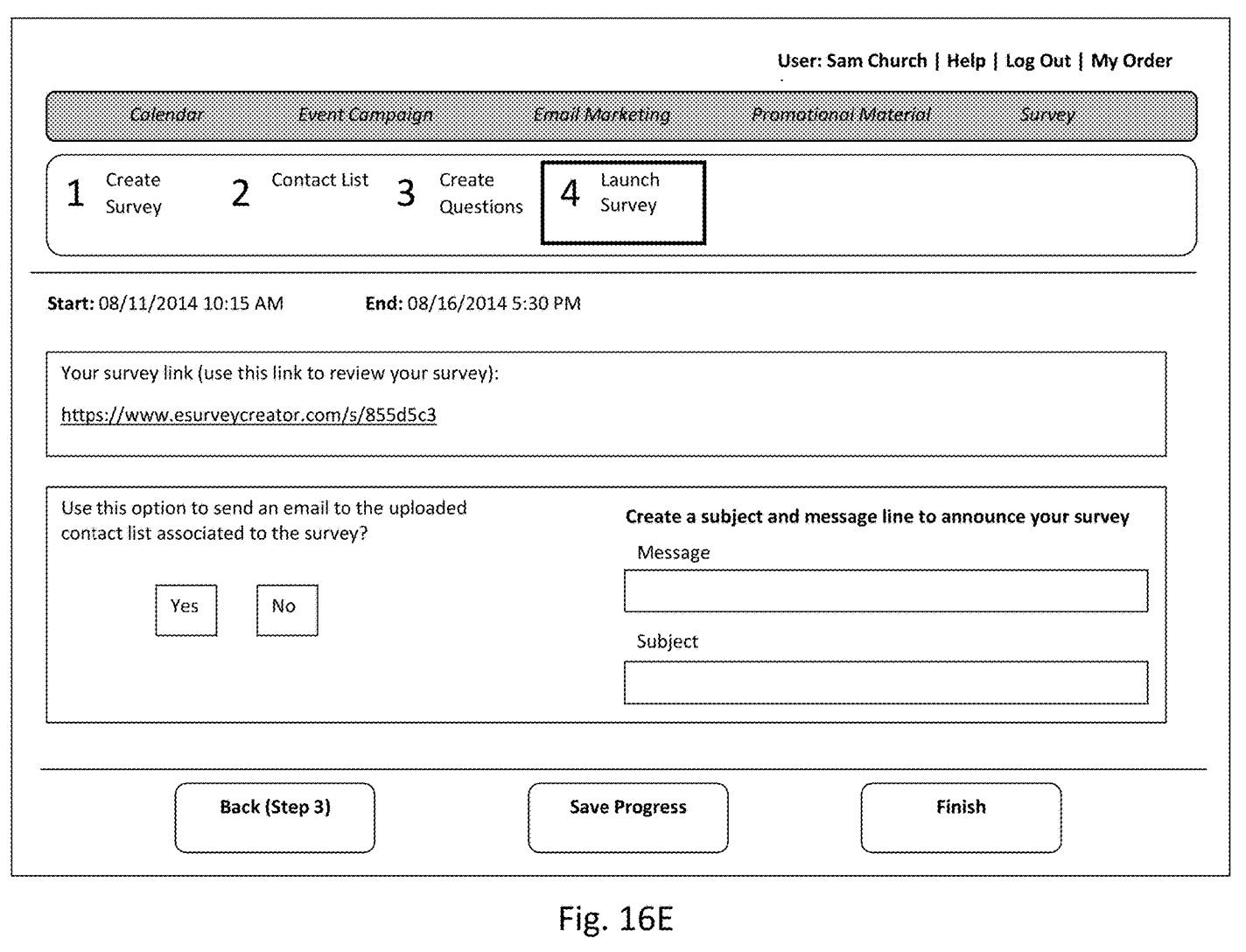

Afterwards, when the user has activated the "Next (step 4)" button, the marketing application generates a landing page for the survey (e.g., https://www.esurveycreator.com/s/855d5c3) and presents it to the user (step S1505) as shown in FIG. 16E. Further, the marketing application provides the user with option to send an email to each of the potential participants on the contact list to inform them of the survey. Finally, the marketing application launches the survey (step S1506).

The steps for creating a new marketing event (e.g. as illustrated in FIG. 15) and a corresponding survey are not limited to those discussed in the present disclosure, and one or more of the steps involved in creating the new marketing event and/or survey may be made optional, and one or more steps may be added in addition to the steps discussed herein.

Figure 17A:
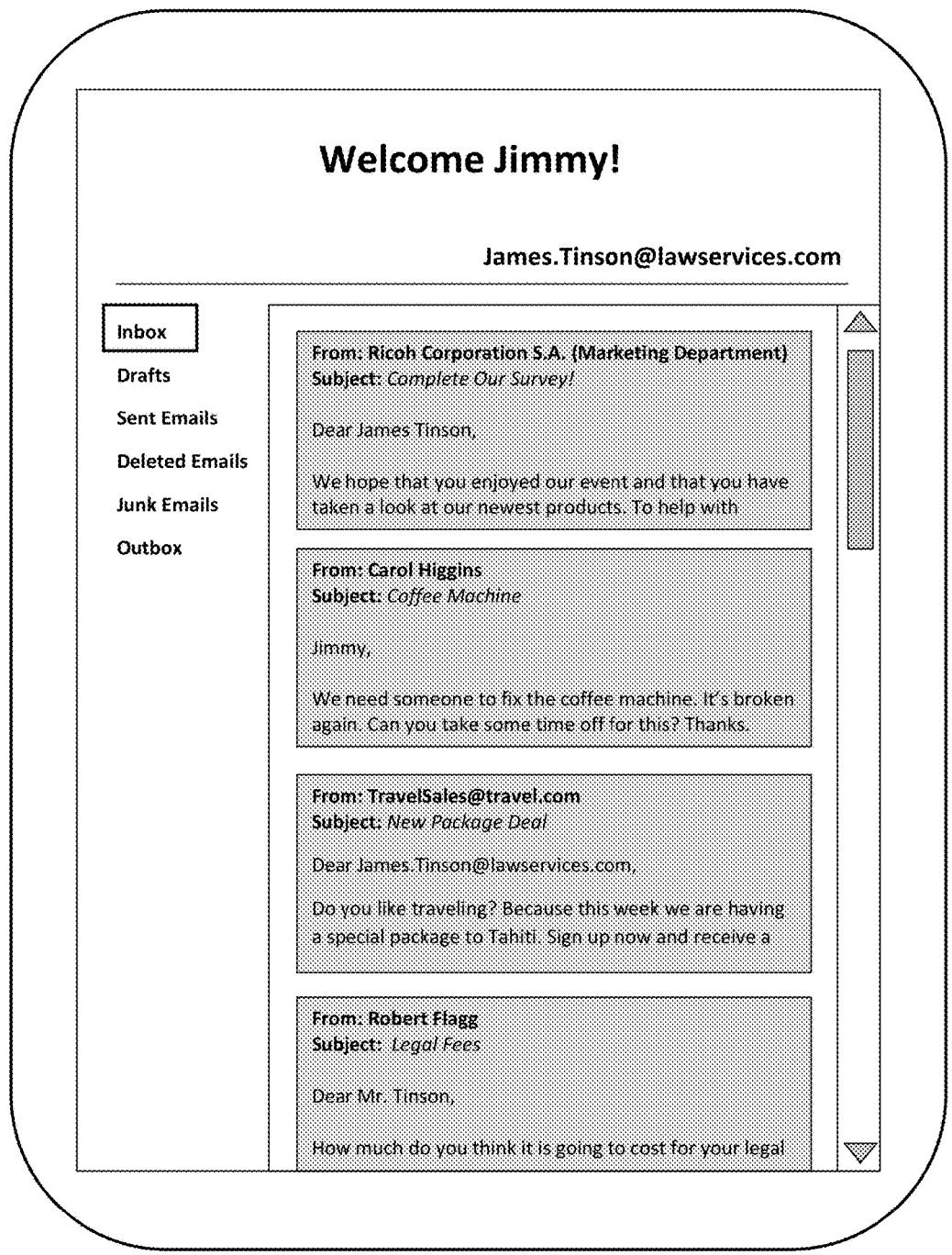
FIGS. 17A-17D show examples of provisions for notifying a prospective respondent of a survey.
Figure 17B:
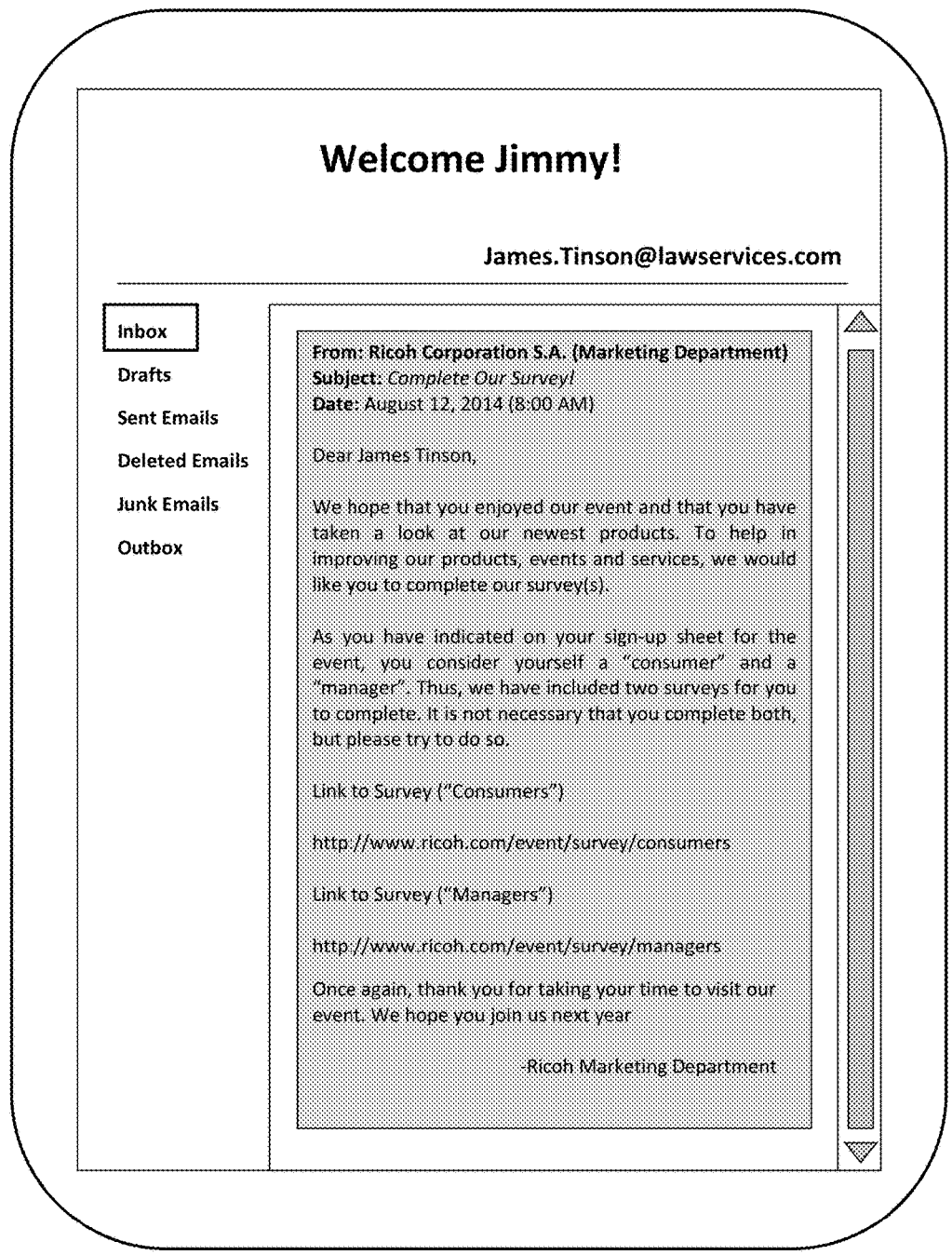
Figure 17C:
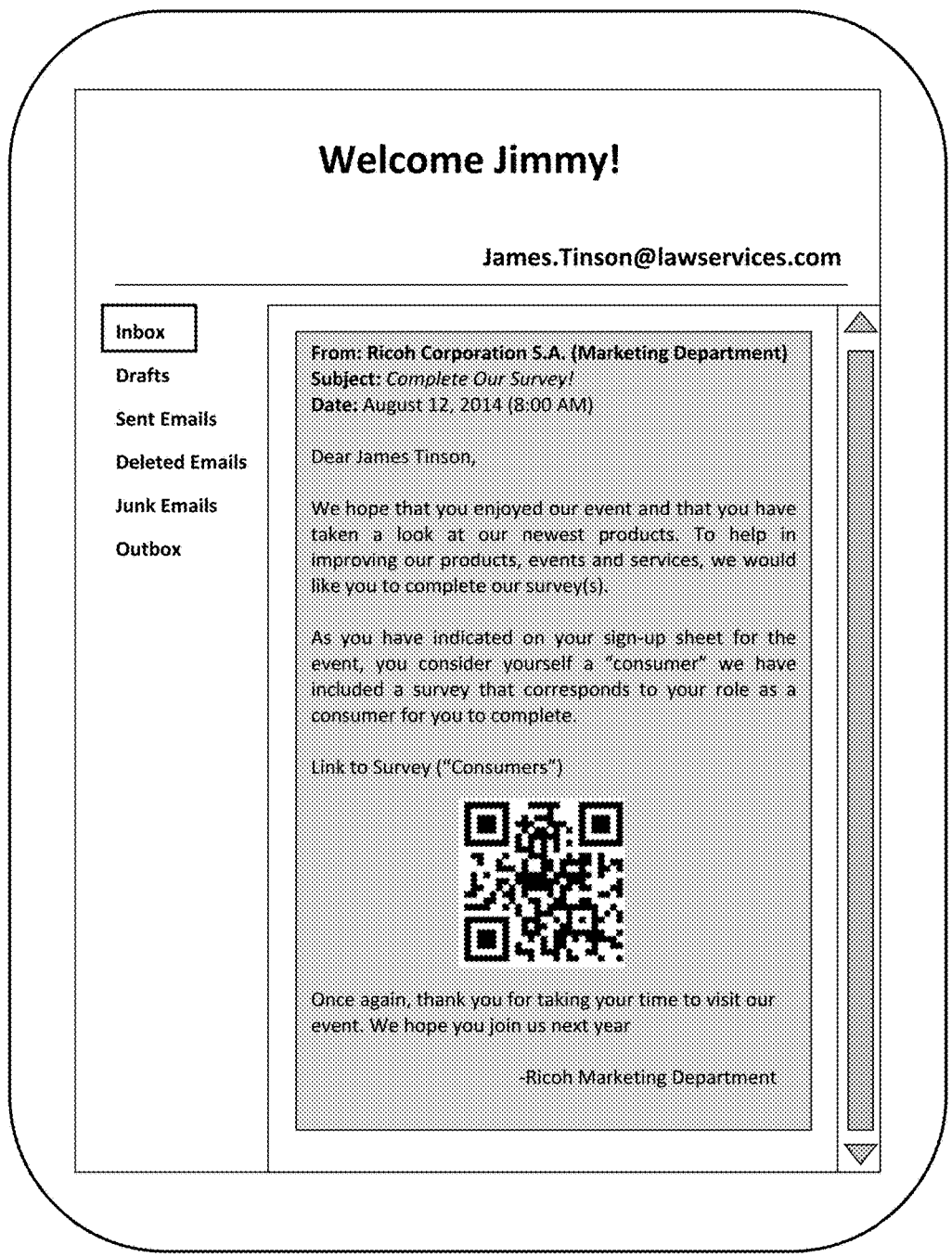
Figure 17D:
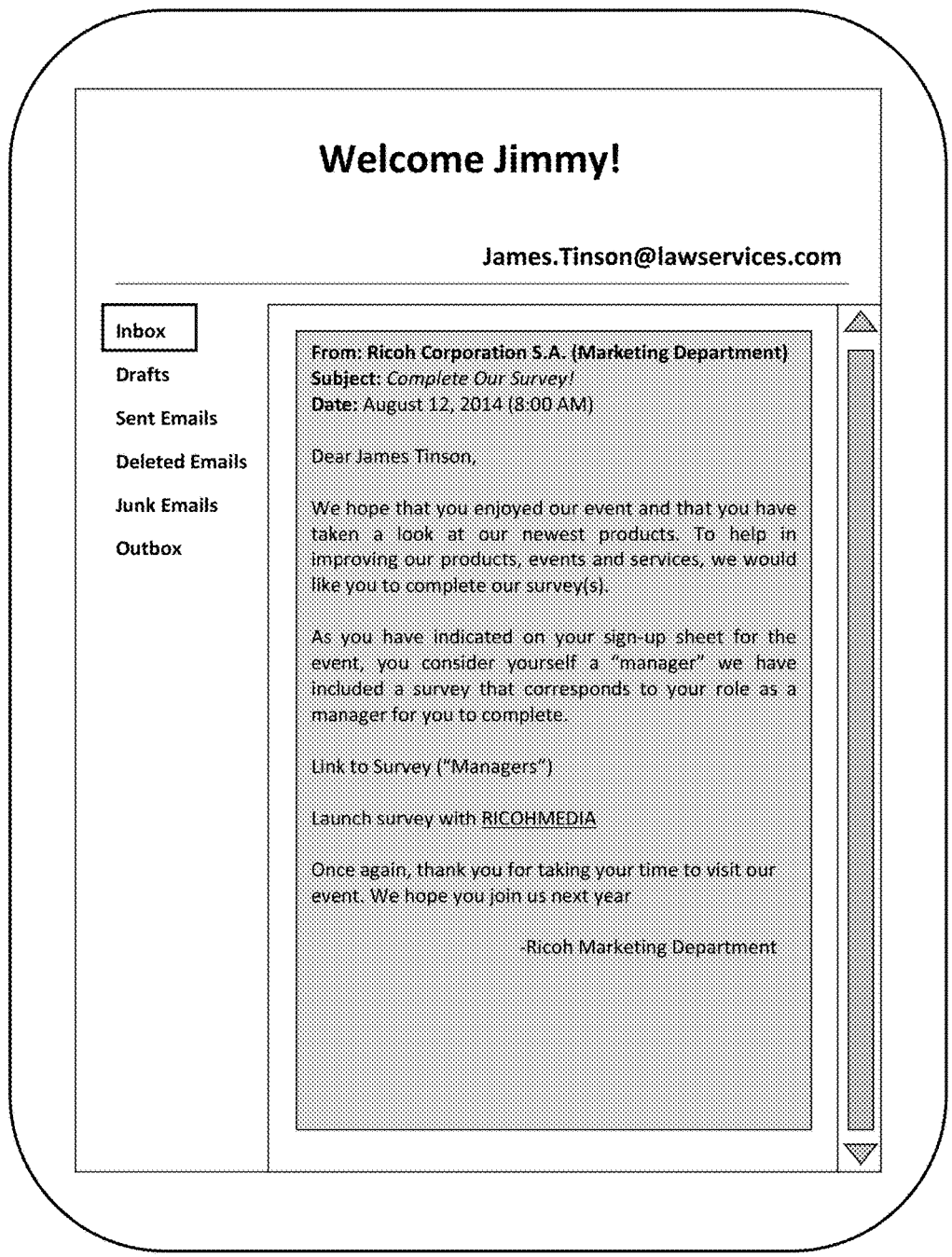

FIG. 17A shows a terminal (e.g. terminal 103) that may be used by a participant of a marketing event. As illustrated, the participant "James 'Jimmy' Tinson" is currently reviewing his emails. He receives an email from an event that he has recently participated in and opens it up as shown in FIG. 17B. The email requests that the participant "Jimmy" complete one or more surveys. Since the "Jimmy" identified himself as a "Consumer" and a "Manager" when he registered for the event, the email recognizes this and, accordingly, presents him with two links to two different surveys (e.g., one survey for manager, one survey for consumers). However, it should be noted that it is not necessary that the email contain a link. For example, it may contain a bar code (e.g., QR code) instead as shown in FIG. 17C. Further, the link may not need be a Uniform Resource Locator (URL). Instead, the link may be launched via an application (e.g., "RICOHMEDIA") instead as shown in FIG. 17D. When the "Jimmy" clicks on the link corresponding to the survey for consumers, he is taken to the corresponding landing page as shown in FIG. 17E. Here, he is presented with a survey corresponding to the event. It should be noted that since the event that "Jimmy" attended lasted for three days, he is given three surveys with each corresponding to each day.

FIG. 17F shows another exemplary embodiment of a landing page containing a survey that is shown on the user terminal. In this case, another participant "Jenn Turner" also attended the same conference as "Jimmy". Like "Jimmy" Jenn is also a manager and in this case she has selected to fill out the survey for managers. This time, when she accesses the link, it takes her to a landing page that is opened by an application (e.g., "RICOH MEDIA"). As shown, the type of questions that are asked in the survey for managers is different from the type of questions asked in the survey for consumers. For example, questions in the survey for managers usually correspond to how products at the event might help the participant's company. On the other hand, questions in the survey for consumers may correspond to products that influence the user's personal life rather than his or her employment.

Figure 18B:
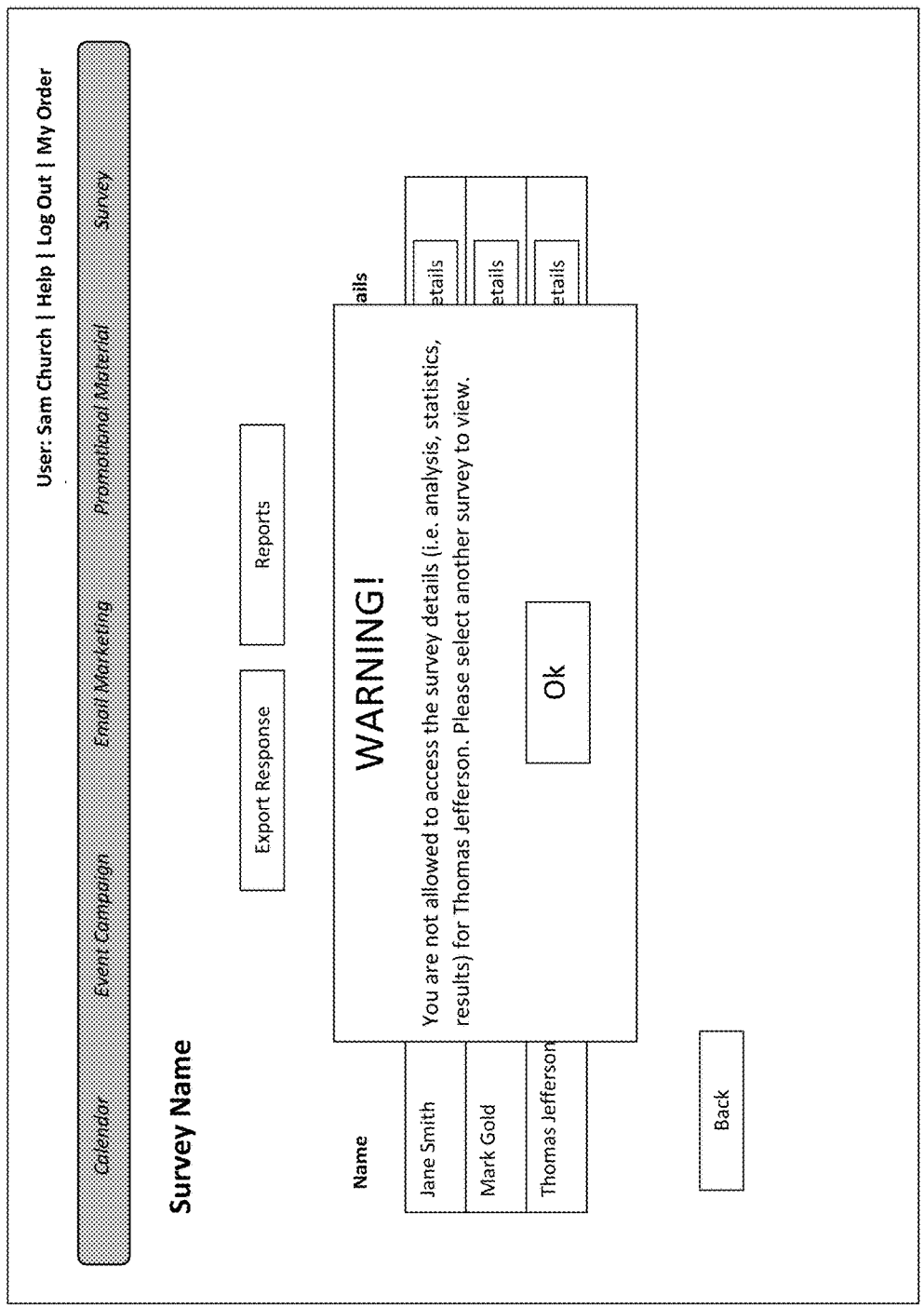

FIG. 18A is an example of a screen that is displayed by the marketing application to a user when he or she attempts to see the results of the survey. As state previously, the user may be part of a marketing team. Here he or she may view the surveys and their corresponding results of the other marketing team members (e.g., "Jane Smith", "Mark Gold", "Thomas Jefferson", etc.). By activating the "Survey Details" button, the user may view all the surveys generated by that team member. However, as illustrated in FIG. 18B, the user may not be allowed to view certain surveys because he or she is not authorized to.

As illustrated in FIG. 18C, the user is shown a list of ongoing surveys (e.g., "Nov. 2, 2014 Ideation to Scoping 'Go No Go' Scoring", "Nov. 3, 2014 Video Content Management", etc.) as well as completed surveys (e.g., "Oct. 5, 2014 Product Designs", "Oct. 13, 2014 XYZ Principles of Management", etc.) corresponding to that team member. Each survey (whether ongoing or incomplete) includes a "Quick View" button and a "Detailed View" button. When the user activates the "Quick View" button, he or she may be shown an analysis of the current survey such as an overall summary or a statistical analysis of the survey. When the user activates the "Detailed View" button, he or she is displayed with a screen illustrated by FIG. 18D. Here, the user may view more detailed information about the current survey.

Figure 18E:
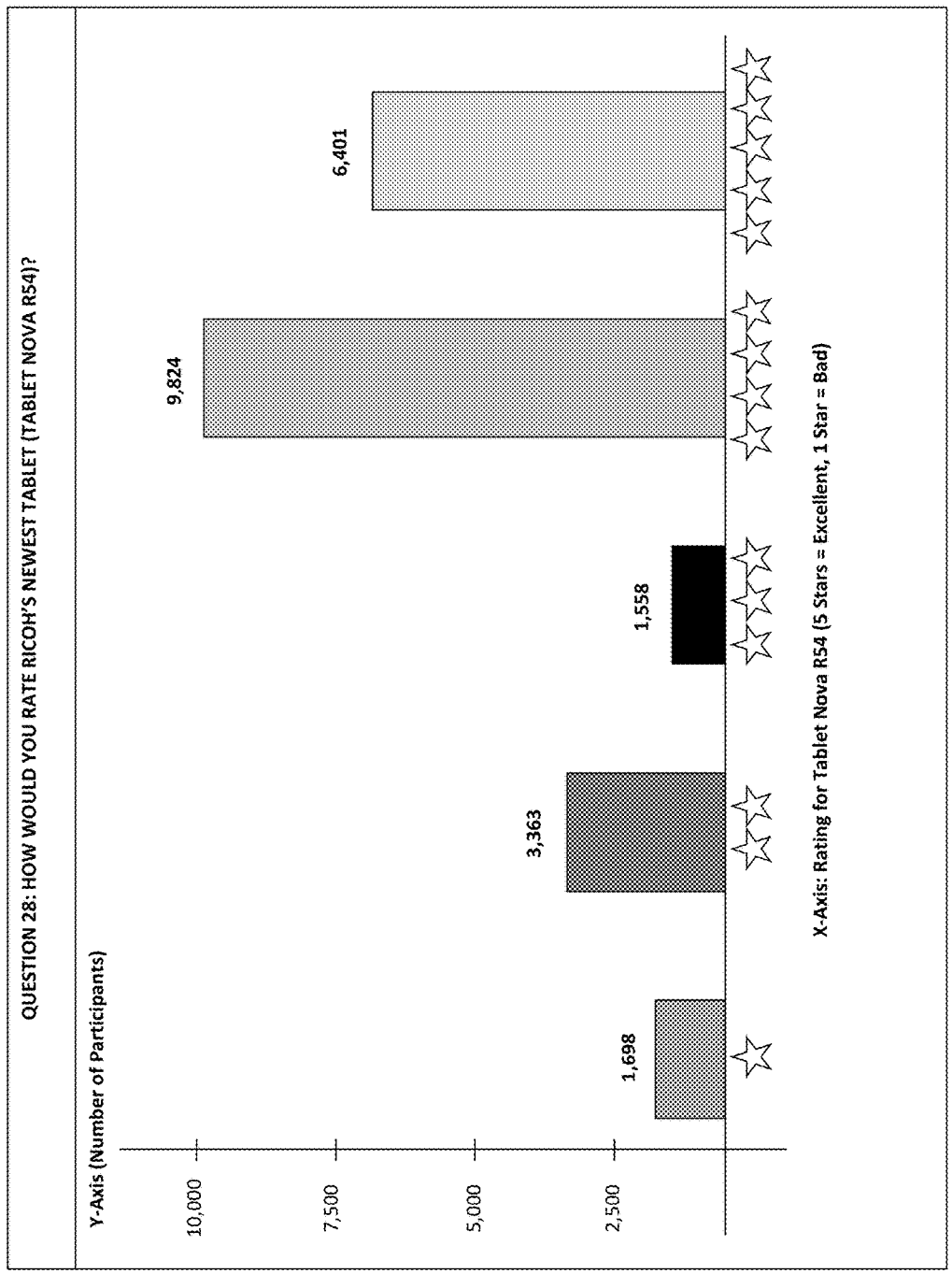

In addition, as shown in FIG. 18E, the user may view the results of individual questions by the survey respondents. For example, in this case, the user wants to view what the respondents thought of one of the products produced by the user's company (e.g. "Tablet Nova R54"). As a result the user is shown a bar graph with an x-axis indicating each of answer choices to the question (e.g. 1-5 stars) and a y-axis indicating the how many participants selected a particular answer choice. Thus, the user can have a more detailed view of each question and perform an analysis on it.

The orders in which the steps are performed in the aforementioned methods are not limited to those shown in the examples of FIGS. 8-11B and 15, and may be switched as long as similar results are achieved. Also, it should be noted that the methods or processes illustrated in the examples of FIGS. 8-11B and 15 may be implemented using any of the systems described in connection with FIGS. 1A and 1B.

The aforementioned specific embodiments are illustrative, and many variations can be introduced on these embodiments without departing from the spirit of the disclosure or from the scope of the appended claims. For example, various aspects, features and advantages disclosed herein can applied to automate device driver installation, even when the device for which the driver is needed does not have any print functionality. Further, although the aspects, features and advantages are discussed herein in connection with a print application, it should be understood that such aspects and feature may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

Further, this application is a continuation-in-part of U.S. application Ser. No. 13/900,132, filed May 22, 2013, which is incorporated in its entirety herein by reference, and additional modifications may be apparent from the disclosure of application Ser. No. 13/900,132.

What is claimed is:

1. A marketing application including one or more programs of computer-executable instructions embodied in a non-transitory computer-readable medium and executable by a computer to configure the computer to include:
   a development module which is executed by the computer to develop materials and maintain information, for a marketing event, in an events database, wherein the developed materials and information are captured in, or linked to, a marketing event object for the marketing event in the events database, and the developed materials includes an event agenda for the marketing event;
   a survey module which is executed by the computer to generate, based at least in part on the information captured in, or linked to, the marketing event object, a survey to be distributed after an end of the event agenda for the marketing event;
   a layout controller to retrieve templates data and forms data from a marketing database; and
   a user interface part providing templates, based on one or more of the templates data and forms data retrieved by the layout controller from the marketing database, for plural question types, for selection to create questions for the survey to be distributed after the end of the event agenda, and for creating a combination question which includes two or more question types combined into a single question, wherein for at least one combination question, the single question combines a first question type including plural selectable answer choices and a second question type including an open-ended question in which no selectable pre-selected answer choices are provided.

2. The marketing application of claim 1, wherein the user interface part provides user access to the information captured in, or linked to, the marketing event object for the marketing event.

3. The marketing application of claim 1,
   wherein the user interface part permits the user to specify a survey start date, and
   wherein the survey module provides access by prospective survey respondents to the survey starting on the survey start date specified by the user through the user interface part.

4. The marketing application of claim 1,
   wherein the user interface part permits the user to create an event survey and add the event survey to the marketing event object, and to create a landing page to which prospective survey respondents are referred to respond to the survey.

5. The marketing application of claim 1,
wherein the user interface part permits the user to add an additional survey, after a first survey has already been generated and added to the marketing event object, and
wherein when multiple surveys have been added to the marketing event object, the survey module creates a microsite at which to access any and each of the multiple surveys.

6. The marketing application of claim 5,
wherein the microsite includes links to respective landing pages at which prospective survey respondents respond to the multiple surveys, respectively.

7. The marketing application of claim 1,
wherein the user interface part permits the user to create a contact list for the survey and to upload to the contact list at least one of a guest list or attendees data maintained in the marketing event object for the marketing event.

8. The marketing application of claim 1,
wherein the user interface part permits the user to create a marketing survey without associating the marketing survey with any marketing event in the events database.

9. The marketing application of claim 1,
wherein the user interface part permits the user to create a marketing survey and to associate the marketing survey with multiple marketing events in the events database.

10. The marketing application of claim 1,
wherein the development module includes a user interface part for the user to create the event agenda for the marketing event and to trigger the survey module to create an event survey for the marketing event.

11. The marketing application of claim 1,
wherein the development module includes a user interface part that permits the user to access the materials and information captured in, or linked to, the marketing event object, and
wherein when the survey has been added to the marketing event object, the user interface part of the development module permits the user to access the survey added to the marketing event object.

12. The marketing application of claim 1, wherein the marketing application further configures the computer to include a response review interface for providing, upon request of an authorized user, access to detailed survey responses.

13. The marketing application of claim 1, wherein the marketing application further configures the computer to include a response review interface for providing, upon request of an authorized user, access to survey response statistics.

14. The marketing application of claim 1, wherein the marketing application further configures the computer to include a response review interface for providing, upon request of an authorized user, access to a summary of survey results.

15. A method performed by a computer executing one or more programs of computer-executable instructions included in a marketing application for a marketing campaign, the method comprising:

using the computer executing the computer-executable instructions to register materials and maintaining information, for a marketing event, including capturing the materials and information for the marketing event in a marketing event object in an events database, wherein the captured materials include an event agenda for the marketing event;

using the computer for providing a survey module and when the survey is executed by the computer, the computer generating, based at least in part on the information captured in the marketing event object, one or more event surveys, upon the event agenda for the marketing event being captured;

retrieving, by a layout controller, templates data and forms data from a marketing database;

using the computer executing the computer-executable instructions for providing templates, based on one or more of the templates data and forms data retrieved by the layout controller from the marketing database, for plural question types, for selection to create questions for the survey to be distributed after the end of the event agenda; and using the computer executing the computer-executable instructions for creating a combination question by combining a first question type including plural selectable answer choices and a second question type including an open-ended question in which no selectable pre-selected answer choices are provided.

16. The method of claim 15, further comprising:
managing plural marketing events, each marketing event amongst the plural marketing events associated with the first client having one or more corresponding event surveys;

creating, after an event survey has been added to the marketing event object, a landing page to which prospective survey respondents are referred to respond to the event survey, wherein when at least one event survey is common to at least two marketing events amongst the plural marketing events, the same landing page is created and associated with each of said at least two marketing events having said at least one survey in common.

17. The method of claim 15, further comprising:
creating, after multiple event surveys have been added to the marketing event object, a microsite including links to respective landing pages at which prospective survey respondents respond to the multiple event surveys, respectively.

18. The method of claim 15, further comprising:
assigning a survey start date to an event survey for the marketing event, after an end of the event agenda for the marketing event;

providing access by prospective survey respondents to the event survey starting on the survey start date; and providing a response review interface, upon user request on or after the survey start date, for user access to any of detailed survey responses, survey response statistics and summary of survey results.

19. The method of claim 15, further comprising:
providing a user interface part for a user to create a marketing survey and to associate the marketing survey with multiple marketing events in the events database.

* * * * *